(12) United States Patent
Yoshimura

(10) Patent No.: US 11,037,323 B2
(45) Date of Patent: Jun. 15, 2021

(54) IMAGE PROCESSING APPARATUS, IMAGE PROCESSING METHOD AND STORAGE MEDIUM

(71) Applicant: CANON KABUSHIKI KAISHA, Tokyo (JP)

(72) Inventor: Kazuhiro Yoshimura, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 152 days.

(21) Appl. No.: 16/277,225

(22) Filed: Feb. 15, 2019

(65) Prior Publication Data
US 2019/0259173 A1    Aug. 22, 2019

(30) Foreign Application Priority Data

Feb. 22, 2018    (JP) .............................. JP2018-030080

(51) Int. Cl.
  *G06T 7/73*        (2017.01)
  *G06T 7/593*       (2017.01)
  *G06T 7/00*        (2017.01)
  *G06K 9/00*        (2006.01)
  *G06T 7/90*        (2017.01)

(52) U.S. Cl.
  CPC ............ *G06T 7/73* (2017.01); *G06K 9/00369* (2013.01); *G06T 7/596* (2017.01); *G06T 7/90* (2017.01); *G06T 7/97* (2017.01)

(58) Field of Classification Search
  CPC .. G06T 7/73; G06T 7/596; G06T 7/97; G06T 7/90; G06K 9/00369

USPC ......................................................... 382/103
See application file for complete search history.

(56) References Cited

U.S. PATENT DOCUMENTS

| 2005/0089212 A1* | 4/2005 | Mashitani | H04N 13/398 |
| | | | 382/154 |
| 2009/0109218 A1* | 4/2009 | Koseki | G06T 15/20 |
| | | | 345/422 |

(Continued)

FOREIGN PATENT DOCUMENTS

| JP | 2001-307073 A | 11/2001 |
| JP | 2004-220292 A | 8/2004 |
| JP | 2010-020487 A | 1/2010 |

*Primary Examiner* — Michael R Neff
(74) *Attorney, Agent, or Firm* — Carter, DeLuca & Farrell LLP

(57) ABSTRACT

The image processing apparatus of the present invention is an image processing apparatus that generates a virtual viewpoint image based on image data obtained by capturing an image capturing area from a plurality of directions by a plurality of cameras, the image processing apparatus including: an acquisition unit configured to acquire viewpoint information of a virtual viewpoint; an area determination unit configured to determine a three-dimensional area in accordance with a position and a size of a specific object within the image capturing area; and a generation unit configured to generate the virtual viewpoint image in accordance with the virtual viewpoint indicated by the viewpoint information based on determination by the area determination unit such that an object within a field of view in accordance with the virtual viewpoint and not included in the three-dimensional area determined by the area determination unit is not displayed in the virtual viewpoint image.

17 Claims, 16 Drawing Sheets

(56) References Cited

U.S. PATENT DOCUMENTS

2009/0315978 A1* 12/2009 Wurmlin .................. G06T 7/20
            348/43
2013/0321593 A1* 12/2013 Kirk ..................... H04N 13/239
            348/51

* cited by examiner

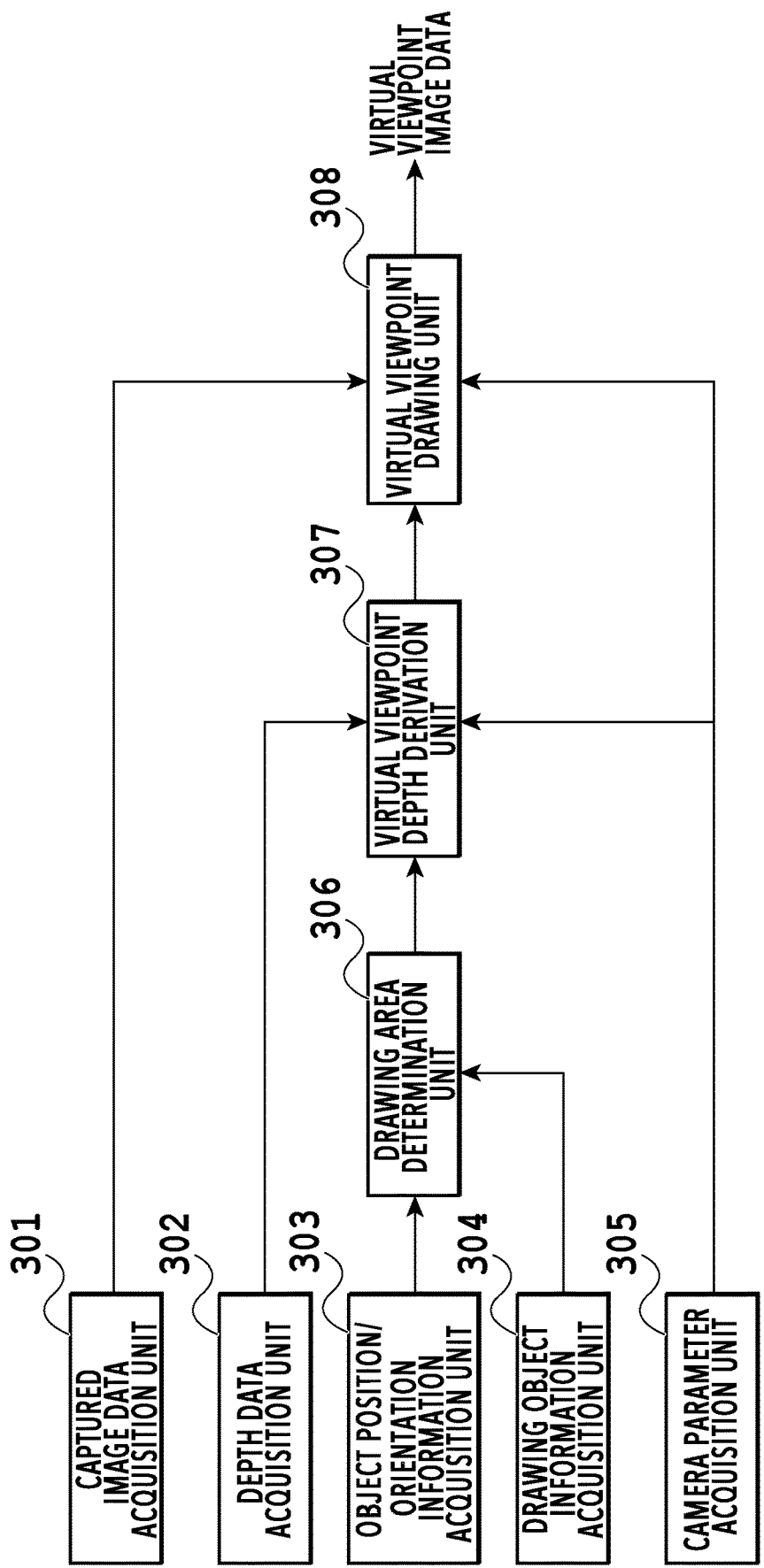

FIG.5

| OBJECT ID | CENTROID POSITION (x,y,z) | POSITION OF PARIETAL REGION OF HEAD | POSITION OF RIGHT HAND | POSITION OF LEFT HAND | POSITION OF RIGHT FOOT | POSITION OF LEFT FOOT |
|---|---|---|---|---|---|---|
| 1 (PERSON) | (100,100,100) | (100,100,180) | (130,100,100) | (70,100,100) | (120,100,0) | (80,100,0) |
| 2 (PERSON) | (300,300,100) | (310,310,175) | (250,300,160) | (320,300,100) | (250,265,15) | (315,300,0) |
| 3 (BALL) | (250,250,15) | / | / | / | / | / |
| 4 (PERSON) | (500,500,90) | (500,500,170) | (470,500,90) | (530,500,90) | (480,500,0) | (520,500,0) |

IMAGE PROCESSING APPARATUS, IMAGE PROCESSING METHOD AND STORAGE MEDIUM

BACKGROUND OF THE INVENTION

Field of the Invention

The present invention relates to a technique to generate an image from a virtual viewpoint based on multi-viewpoint images captured from a plurality of viewpoint positions.

Description of the Related Art

As a technique to reproduce an image from a camera (virtual camera) that does not exist actually but is virtually arranged within a three-dimensional space by using images captured by a plurality of real cameras, there is a virtual viewpoint image technique (Japanese Patent Laid-Open No. 2010-20487).

However, in a case where an object existing within an image capturing range of a virtual camera is drawn as it is and a virtual viewpoint image is generated, there is a possibility that such a problem as follows occurs. That is, for example, there is a possibility that a virtual viewpoint image in which the intention of a video image creator is not reflected sufficiently is generated, or a possibility that the processing load relating to generation of a virtual viewpoint image increases. In addition to the above, there is also a possibility that the data itself of a virtual viewpoint image increases.

SUMMARY OF THE INVENTION

The image processing apparatus according to one embodiment of the present invention is an image processing apparatus that generates a virtual viewpoint image based on image data obtained by capturing an image capturing area from a plurality of directions by a plurality of cameras, the image processing apparatus including: an acquisition unit configured to acquire viewpoint information indicating a position and a direction of a virtual viewpoint; an area determination unit configured to determine a three-dimensional area in accordance with a position and a size of a specific object within the image capturing area; and a generation unit configured to generate the virtual viewpoint image in accordance with the position and the direction of the virtual viewpoint indicated by the viewpoint information acquired by the acquisition unit based on determination by the area determination unit such that an object within a field of view in accordance with the virtual viewpoint and not included in the three-dimensional area determined by the area determination unit is not displayed in the virtual viewpoint image.

Further features of the present invention will become apparent from the following description of exemplary embodiments with reference to the attached drawings.

BRIEF DESCRIPTION OF THE DRAWINGS

FIG. 3 is a diagram showing a function block of the image processing apparatus;

FIG. 5 is a table showing a list example of object position/orientation information;

DESCRIPTION OF THE EMBODIMENTS

In the following, embodiments for embodying the present invention are explained by using the drawings. The following embodiments are not intended to limit the invention according to the scope of the claims and all combinations of features explained in the embodiments are not necessarily indispensable to the solution of the invention.

First Embodiment

Figure 1:
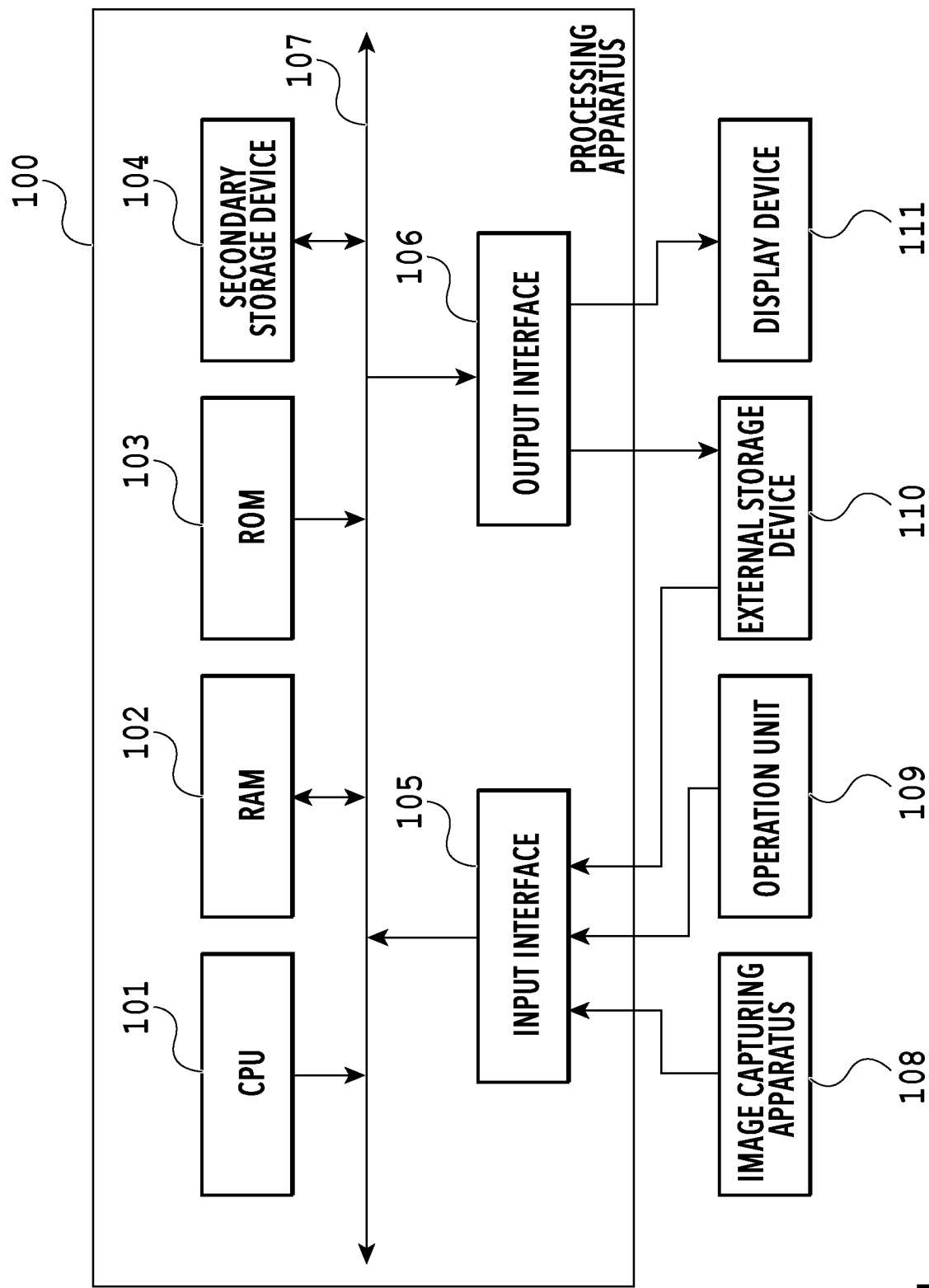
FIG. 1 is a diagram showing an example of a hardware configuration of an image processing apparatus according to a first embodiment.

An image processing apparatus 100 (hereinafter, referred to as a processing apparatus 100) includes the same configuration as that of a general information processing apparatus represented by a personal computer or the like. FIG. 1 is a diagram showing an example of a hardware configuration of the processing apparatus 100. The processing apparatus 100 has a CPU 101, a RAM 102, a ROM 103, a secondary storage device 104, an input interface (hereinafter, "interface" is described as "I/F") 105, and an output I/F 106. Then, each unit configuring the processing apparatus 100 is connected to one another by a system bus 107. Further, the processing apparatus 100 is connected to an image capturing apparatus 108, an operation unit 109, and an external storage device (external memory) 110 via the input I/F 105. Furthermore, the processing apparatus 100 is connected to the external storage device 110 and a display device 111 via the output I/F 106. The CPU 101 executes programs stored in the ROM 103 by using the RAM 102 as a work memory and centralizedly controls each unit of the processing apparatus 100 via the system bus 107. Due to this, various kinds of processing, to be described later, are performed. The secondary storage device 104 is a largecapacity storage device storing various kinds of data handled by the processing apparatus 100 and in the present embodiment, an HDD is used. It is possible for the CPU 101 to write data to the secondary storage device 104 and to read data stored in the secondary storage device 104 via the system bus 107. It is possible to use various storage devices, such as an optical disc drive and a flash memory, in addition to the HDD as the secondary storage device 104. The input I/F 105 is a serial bus I/F, for example, such as USB and IEEE 1394, and data, a command, or the like is input to the processing apparatus 100 from an external device via this input I/F 105. The processing apparatus 100 acquires various kinds of data from the image capturing apparatus 108 (for example, data of images and moving images captured by the image capturing apparatus 108, image capturing condition parameters of the image capturing apparatus 108, and so on). Further, the processing apparatus 100 acquires data from the external storage device 110 (for example, storage media, such as hard disk, memory card, CF card, SD card, and USB memory) via this input I/F 105. The output I/F 106 includes a serial bus I/F, such as USB and IEEE 1394, as in the case with the input I/F 105. In addition, it is also possible to use a video image output terminal, for example, such as DVI and HDMI. Data or the like is output to an external device from the processing apparatus 100 via this output I/F 106. The processing apparatus 100 displays an image by outputting a processed image and the like to the display device 111 (various image display devices, such as a liquid crystal display) via this output I/F 106. Components of the processing apparatus 100 exist other than those described above. Those are not the main purpose of the present invention, and therefore, explanation is omitted.

Figure 2A:
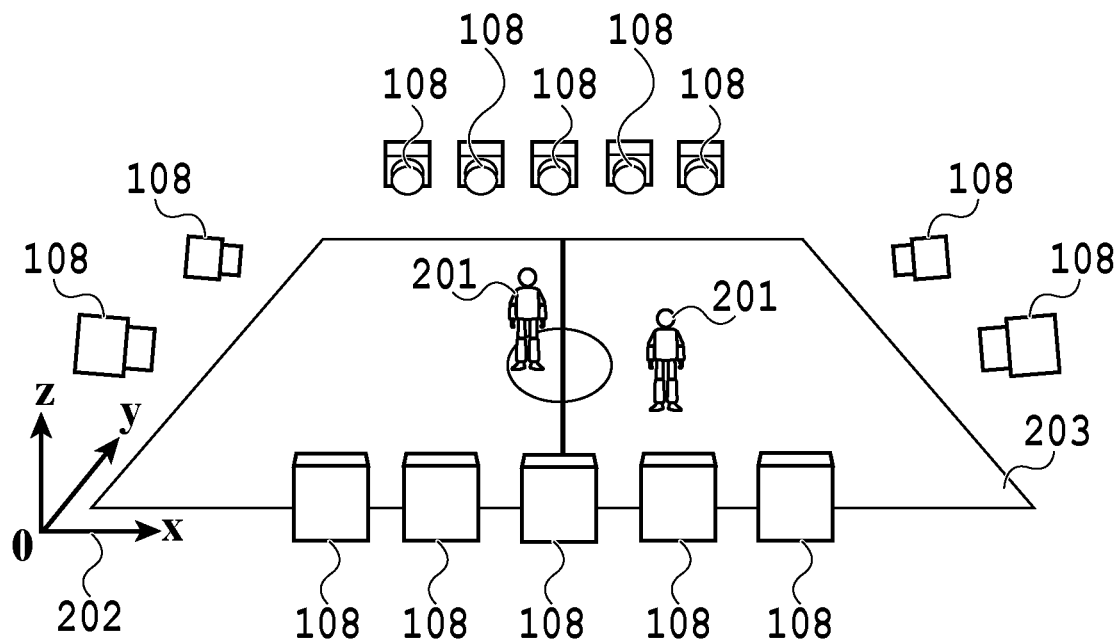
FIG. 2A and FIG. 2B are diagrams showing an arrangement example of image capturing apparatuses of the image processing apparatus.
Figure 2B:
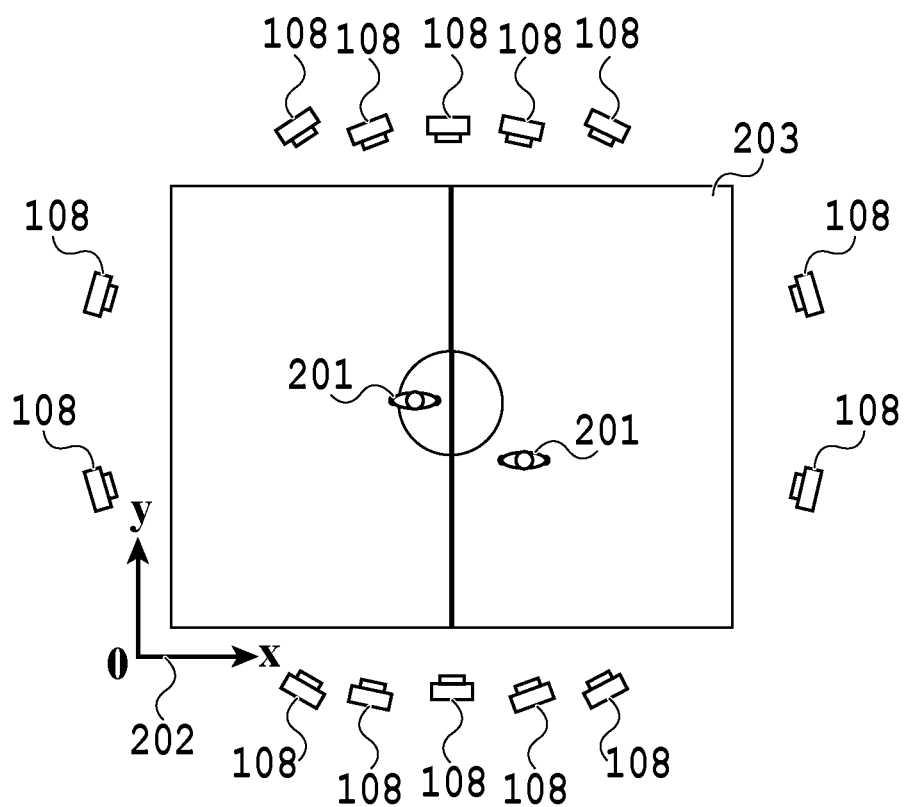

FIG. 2A and FIG. 2B are diagrams showing an arrangement example of the image capturing apparatuses 108 included in the image processing apparatus according to the present embodiment. In the present embodiment, a plurality of cameras, each of which is the image capturing apparatus 108, is arranged. FIG. 2A is a perspective diagram explaining the arrangement of the cameras and FIG. 2B is a plan diagram explaining the arrangement of the cameras. By a plurality of (14 in the example shown schematically) image capturing apparatuses (cameras) 108 arranged so as to surround a field 203 for a game, such as soccer, an object 201, such as a player and a ball on the field, which is an image capturing area target, is captured. Image data captured by each image capturing apparatus 108 is generated at a plurality of viewpoints different in disparity from one another. In the present embodiment, although explanation is given by taking a sport scene as an example, it is possible to widely apply the method, to be explained below, to a scene in which a virtual viewpoint image is generated from multi-viewpoint images obtained by arranging a plurality of cameras so as to surround a material body (object), which is a subject. A coordinate system 202 indicates a coordinate system used in a case of describing the position and the like of the camera. In FIG. 2A and FIG. 2B, although the number of cameras is set to 14, the number is not limited in particular. The larger the number of cameras, the smaller the number of blind spots of an object becomes, and therefore, it is preferable for the number of cameras to be large because it is possible to generate a more accurate virtual viewpoint image. Note that it is desirable that at least a plurality of cameras be arranged on each of the four sides.

[Processing in Processing Apparatus 100]

Figure 4:
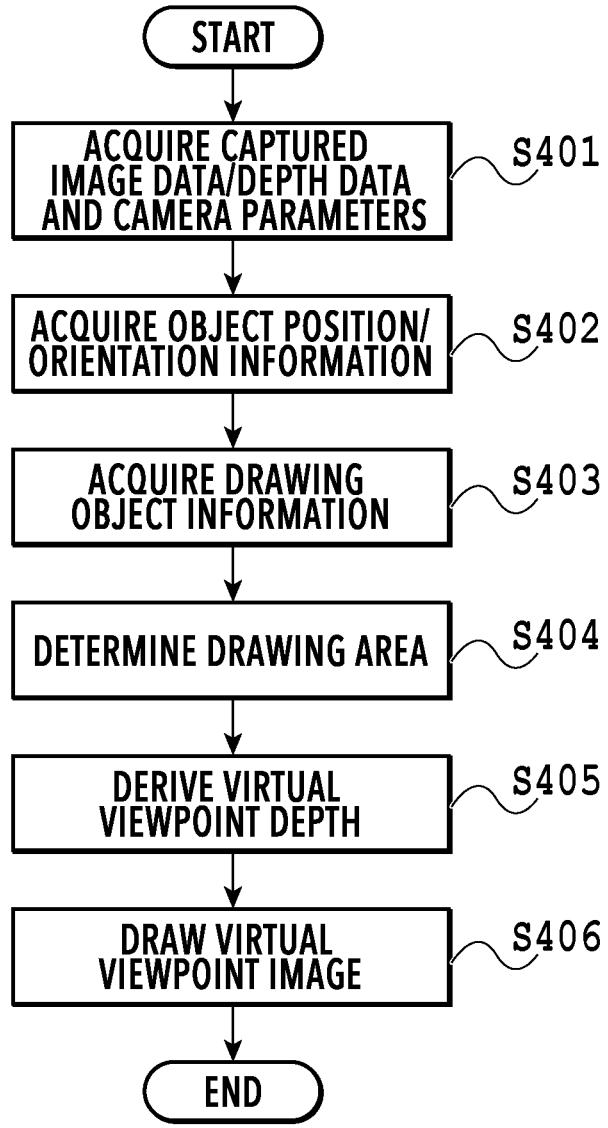
FIG. 4 is a flowchart showing a flow of entire generation processing of a virtual viewpoint image by the image processing apparatus.

In the following, processing performed in the processing apparatus 100 of the first embodiment is explained by using a function block diagram shown in FIG. 3 and a flowchart shown in FIG. 4. As shown in FIG. 3, the processing apparatus 100 has a captured image data acquisition unit 301, a depth data acquisition unit 302, an object position/orientation information acquisition unit 303, a drawing object information acquisition unit 304, and a camera parameter acquisition unit 305. Further, the processing apparatus 100 has a drawing area determination unit 306, a virtual viewpoint depth derivation unit 307, and a virtual viewpoint drawing unit 308. The processing apparatus 100 implements the function of each of the above-described components by the CPU 101 reading and executing control programs stored within the ROM 103. It may also be possible to configure the processing apparatus 100 so as to include a dedicated processing circuit corresponding to each component. In the following, the flow of processing performed by each component is explained. In the following description, each numeral with a prefix S indicates the corresponding step in the flowchart.

At S401, the captured image data acquisition unit 301 acquires multi-viewpoint image data of an arbitrary image capturing scene captured by the camera, which is the image capturing apparatus 108, via the input I/F 105. In the present embodiment, the number of cameras, each of which is the image capturing apparatus 108, is 14, and therefore, 14 pieces of image data is acquired in an arbitrary image capturing scene. The captured image data acquisition unit 301 outputs the acquired 14 pieces of image data of an arbitrary image capturing scene to the virtual viewpoint drawing unit 308. Further, at S401, the depth data acquisition unit 302 acquires depth data of each camera, which is the image capturing apparatus 108. The depth data referred to here indicates distance data of each pixel of the image data captured by each camera. It may also be possible to generate depth data of each camera by using a publicly known technique (for example, Japanese Patent Laid-Open No. 2001-307073) or to acquire by using a depth sensor by providing the depth sensor for each camera. The depth data acquisition unit 302 outputs the acquired depth data to the virtual viewpoint depth derivation unit 307. Further, at S401, the camera parameter acquisition unit 305 acquires camera parameters via the input I/F 105 or from the secondary storage device 104. The camera parameters include internal parameters, external parameters, distortion parameters, and so on of each camera (real camera), which is the image capturing apparatus 108, and the virtual camera (camera arranged at a virtual viewpoint). Here, the internal parameters are coordinate values of the center of an image and the focal length of the lens of a camera and the external parameters are parameters indicating the position (viewpoint position) and the orientation (direction of the line of sight) of a camera. The distortion parameters are parameters indicating distortion of the lens of a camera. As the parameters of a real camera, it may also be possible to use estimated values estimated by SfM (Structure from Motion) based on the multi-viewpoint image data, or to use the derived values derived in advance by performing calibration using a chart or the like. As the camera parameters of a virtual viewpoint, the camera parameters of a viewpoint from which a user desires to view, that is, the camera parameters derived in correspondence to the virtual camera specified by a user are acquired. Specifically, information relating to the virtual camera in a virtual viewpoint image desired to be generated, specifically, information (viewpoint information) on the virtual viewpoint position and the direction of the line of sight is acquired based on a user operation via a UI screen, not shown schematically. It may also be possible to acquire the virtual camera information prepared in advance from the secondary storage device 104 or the external storage device 110. The camera parameter acquisition unit 305 outputs the acquired camera parameters to the virtual viewpoint depth derivation unit 307 and the virtual viewpoint drawing unit 308.

At S402, the object position/orientation information acquisition unit 303 acquires position/orientation information on all the objects 201 existing on the field 203. Here, the object position/orientation information indicates information including object position information and orientation information. For example, in a case where the object is a person, the object position/orientation information includes information indicating the centroid position, the position of the parietal region of the head, and the positions of the tip portions of the left and right feet and hands. The object position/orientation information also indicates the size and shape of the object by indicating the position of each region of the object. In a case where the object is a thing, the object position/orientation information includes centroid position information indicating the centroid position. It is possible to generate object position/orientation information by using a publicly known technique (for example, Japanese Patent Laid-Open No. 2004-220292). Here, it is assumed that the object position/orientation information is information classified into states where it is possible to identify which object each of a plurality of objects existing on the field represents, and an ID for identification is given to each object. For example, the objects are classified into two kinds of object, that is, persons and a ball as in the present embodiment.

FIG. 5 is a table showing a list example of the acquired object position/orientation information. In the present embodiment, a case is explained where the object position/orientation information as shown in FIG. 5 is acquired. The embodiment of the object position/orientation information that is acquired is not limited to this and it is possible to perform the present embodiment even in a case where the object position/orientation information is more detailed information (for example, a plurality of pieces of joint position information) or more simplified information (for example, only the centroid position). The object position/orientation information acquisition unit 303 outputs the acquired object position/orientation information to the drawing area determination unit 306.

At S403, the drawing object information acquisition unit 304 acquires drawing object information. Here, the drawing object information is information obtained by classifying all the objects existing on the field as a drawing object or a non-drawing object. In the present embodiment, it is assumed that an ID of an object a user desires to view, that is, an ID of an object on which a user focuses attention is input via a UI screen, not shown schematically. Due to this, the object corresponding to the input ID is classified as a drawing object, which is a drawing target, and the object corresponding to an ID that is not input is classified as a non-drawing object, which is a non-drawing target. In the present embodiment, although a case is explained where a user inputs an ID of an object a user desires to view (on which a user focuses attention), it is also possible to input an ID of an object a user does not desire to view, that is, an ID of an object on which a user does not focus attention. In this case, the object corresponding to the input ID is classified as a non-drawing object and the object corresponding to an ID that is not input is classified as a drawing object. The drawing object information acquisition unit 304 outputs the acquired drawing object information to the drawing area determination unit 306. The classification method of objects is not limited to the above. For example, it may also be possible for the drawing object information acquisition unit 304 to receive a user operation to select a specific object from a plurality of objects displayed on a UI screen and to identify an object specified based on the user operation as a drawing object. Further, in the present embodiment, although as which of a drawing object class and a non-drawing object class each object is classified is determined, the number of classes of classification is not limited to this. For example, an object may be classified as one of three or more classes and the drawing method of an object (for example, transparency of an object) may be different for each class.

Figure 6A:
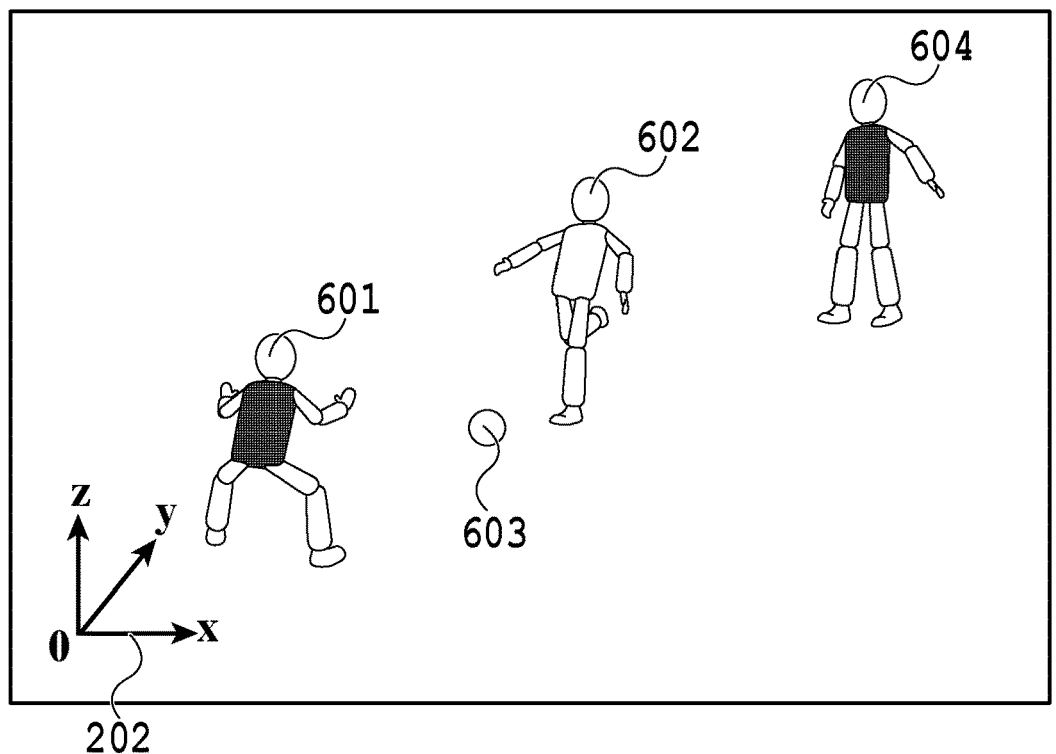
FIG. 6A and FIG. 6B are image diagrams showing object positions/orientations and drawing areas.
Figure 6B:
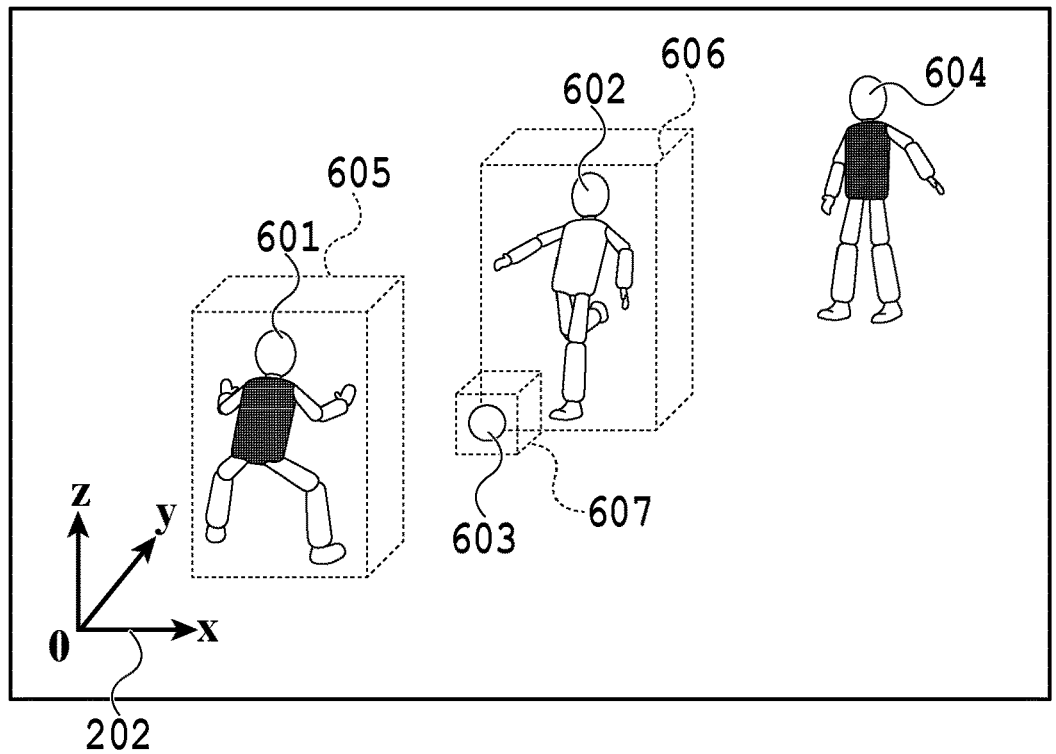

At S404, the drawing area determination unit 306 determines a drawing-target three-dimensional area (hereinafter, referred to as a drawing area) based on the drawing object information acquired at S403 and the object position/orientation information acquired at S402. FIG. 6A is an image diagram of a virtual viewpoint image corresponding to the object position/orientation information shown in FIG. 5, which is generated based on the image data of a certain image capturing scene. FIG. 6B is an image diagram displaying the image diagram in FIG. 6A by overlapping drawing areas. In the present embodiment, it is assumed that as drawing object information, information such as drawing object IDs=1, 2, 3 and a non-drawing object ID=4 is given. From each ID and the position coordinates thereof, it is known that in FIG. 6A, a player 601, a player 602, and a ball 603 correspond to the IDs=1, 2, 3, respectively, and are drawing objects to be drawn. Further, it is known that a player 604 corresponds to the ID=4 and is a non-drawing object not to be drawn. The drawing area determination unit 306 determines drawing areas based on the object position/ orientation information on the three objects, which are drawing objects. In the present embodiment, in order to simplify explanation, it is assumed that the drawing area of each object is represented by coordinate values of eight vertexes of a rectangular parallelepiped. Note that the drawing area is only required to have a predetermined shape, and may have another polyhedron and a sphere, not limited to a rectangular parallelepiped. The player 601 and the player 602 correspond to person objects and the x-coordinates of the drawing areas of the person objects are derived by, for example, expression (1). Note that $(cx, cy, cz)$ indicates the centroid position and $(hx, hy, hz)$ indicates the position of the parietal region of the head. Further, $(lhx, lhy, lhz)$ indicates the position of the tip of the left hand and $(rhx, rhy, rhz)$ indicates the position of the tip of the right hand. Furthermore, $(lfx, lfy, lfz)$ indicates the position of the tip of the left foot and $(rfx, rfy, rfz)$ indicates the position of the tip of the right foot. Then, $\alpha$ indicates a margin (for example, $\alpha=10$)

(Mathematical expression 1)

$\min x = \min[hx, lhx, rhx, lfx, rfx] - \alpha$ $\max x = \max[hx, lhx, rhx, lfx, rfx] + \alpha$ if $\min x \geq cx$ $\min x = cx - (\max x - cx)$ if $\max x \leq cx$ $\max x = cx + (cx - \min x)$ \hfill (1)

The y-coordinates and the z-coordinates of the drawing areas of the person objects are derived similarly as in the case with the x-coordinates. That is, the y-coordinates of the drawing areas of the person objects are derived by expression (2) and the z-coordinates of the drawing areas of the person objects are derived by expression (3).

(Mathematical expression 2)

$$\min y = \min[hy, lhy, rhy, lfy, rfy] - \alpha$$

$$\max y = \max[hy, lhy, rhy, lfy, rfy] + \alpha$$

if min $y \geq cy$ min $y = cy - (\max y - cy)$ if max $y \leq cy$ $$\max y = cy + (cy - \min y) \qquad (2)$$

(Mathematical expression 3)

$$\min z = \min[hz, lhz, rhz, lfz, rfz] - \alpha$$

$$\max z = \max[hz, lhz, rhz, lfz, rfz] + \alpha$$

if min $z \geq cz$ min $z = cz - (\max z - cz)$ if max $z \leq cz$ $$\max z = cz + (cz - \min z) \qquad (3)$$

Consequently, by expression (1) to expression (3), the coordinate values of the eight vertexes expressed by expression (4) are derived. The drawing area determination unit 306 determines a rectangular parallelepiped connecting the derived coordinate values of the eight vertexes as the drawing area of the person object. The drawing area thus determined is a three-dimensional area in accordance with the position and size of the object.

(Mathematical expression 4)

$$CubePoints = \begin{bmatrix} (\min x, \min y, \min z), (\max x, \min y, \min z), \\ (\min x, \max y, \min z), \\ (\min x, \min y, \max z), (\min x, \max y, \max z), \\ (\max x, \min y, \max z), \\ (\max x, \max y, \min z), (\max x, \max y, \max z) \end{bmatrix} \qquad (4)$$

The ball 603 corresponds to a thing object and the drawing area determination unit 306 determines a rectangular parallelepiped whose size is determined from the size of the ball and whose center is located at the acquired centroid position of the ball as the drawing area of the thing object. FIG. 6B is an image diagram displaying the image diagram of the objects shown in FIG. 6A by overlapping the determined drawing areas. A block 605 indicates the drawing area of the player 601, a block 606 indicates the drawing area of the player 602, and a block 607 indicates the drawing area of the ball 603. The drawing area determination unit 306 outputs the determined drawing areas to the virtual viewpoint depth derivation unit 307.

At S405, based on the drawing areas acquired by the virtual viewpoint depth derivation unit 307, the depth data, and the camera parameters, a virtual viewpoint depth map, which is virtual viewpoint depth data, is derived. The method of generating a virtual viewpoint depth map based on the depth map of each camera, which is the image capturing apparatus 108, the camera parameters of the camera, and the camera parameters of the virtual viewpoint is publicly known. For example, it is known that an object exists at a point converted into a three-dimensional space based on the depth data and camera parameters of a real camera, and therefore, it is possible to derive the depth of the corresponding pixel on a virtual viewpoint by converting the point based on the camera parameters of the virtual viewpoint. For example, by expression (5) below, a certain pixel in the depth map of a real camera is converted into the three-dimensional space. For example, a depth of a virtual viewpoint is derived from a point in the three-dimensional space. In expression (5) and expression (6), P indicates the three-dimensional coordinates of a point in the three-dimensional space and m to which "_" is added indicates a certain pixel of a real camera. A indicates the internal parameter of a real camera, R indicates the rotation parameter, which is the external parameter, t indicates the translation parameter, which is the external parameter, and d indicates the depth of the pixel m ("–" is added). Further, A' indicates the internal parameter of a virtual viewpoint, R' indicates the rotation parameter, which is the external parameter of the virtual viewpoint, and t' indicates the translation parameter, which is the external parameter of the virtual viewpoint. Then, x' and y' indicate the camera coordinates of the virtual viewpoint, u' and v' indicate the image coordinates of the virtual viewpoint, and d' indicates the depth of the pixel (u', v') of the virtual viewpoint. (Cx, Cy) indicates the centroid position of the pixel (u', v') of the virtual viewpoint.

(Mathematical expression 5)

$$P = d(AR)^{-1}\tilde{m} - t \qquad (5)$$

(Mathematical expression 6)

$$\begin{pmatrix} x' \\ y' \\ d' \end{pmatrix} = A'R'(P + t'), \begin{pmatrix} u' \\ v' \\ 1 \end{pmatrix} = \begin{pmatrix} \frac{x'}{d'} + c_x \\ \frac{y'}{d'} + c_y \\ 1 \end{pmatrix} \qquad (6)$$

Figure 7:
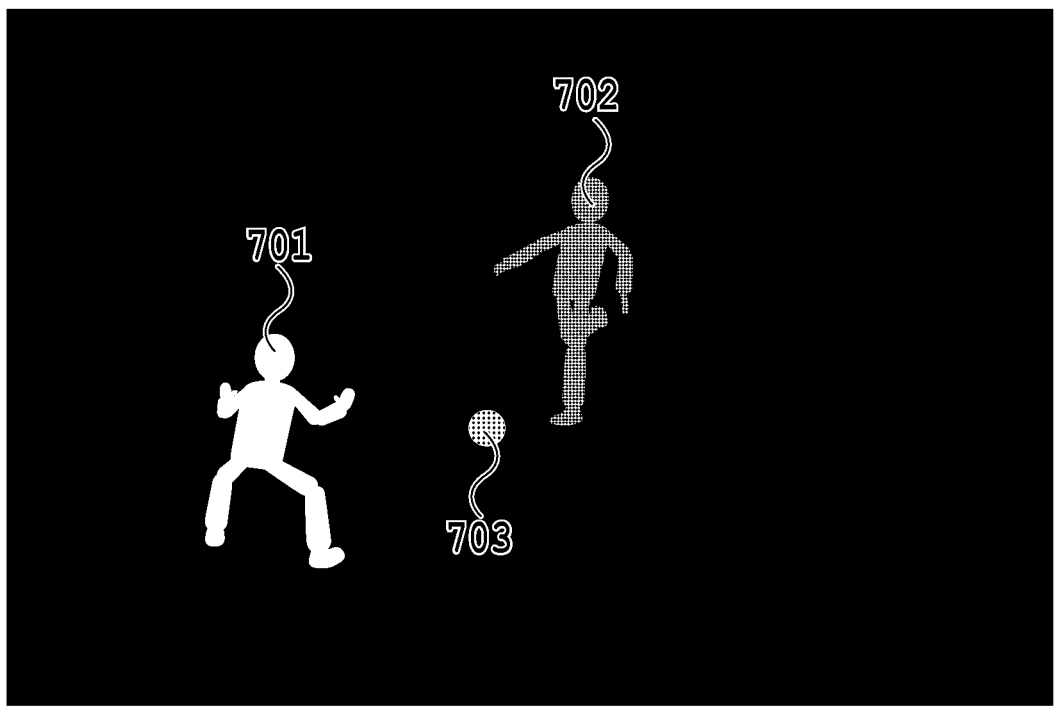
FIG. 7 is an image diagram of a virtual viewpoint depth map by a virtual viewpoint depth derivation unit of the image processing apparatus.

By deriving the depth of the virtual viewpoint from the plurality of cameras by expression (5) and expression (6) described above and taking the shortest depth in each pixel of the virtual viewpoint as the depth of the pixel, it is possible to generate a depth map of the virtual viewpoint. In the present embodiment, at the time of deriving the depth of the virtual viewpoint, a limit is imposed by the drawing area determined by the drawing area determination unit 306. Specifically, only in a case where the point P in the three-dimensional space, which is derived from a real camera, is included within the determined drawing area, the drawing area is reflected in the depth map of the virtual viewpoint. Due to this, it is possible to generate a depth map of the virtual viewpoint, in which only the drawing object is reflected. FIG. 7 is an image diagram of the generated depth map of the virtual viewpoint. It is known that in the depth map of the virtual viewpoint, the player 601, the player 602, and the ball 603 included in the drawing areas are reflected and areas 701, 702, and 703 corresponding to the players 601, 602, and the ball 603, respectively, are included. Further, it is known that the player 604 not included in the drawing area is not included in the depth map. In the present embodiment, although the depth map of the virtual viewpoint is derived from the depth data of the plurality of real cameras, the derivation method of the depth map of the virtual viewpoint is not limited to this derivation method. As the derivation method of the depth map of the virtual viewpoint, for example, it is possible to use a method in which a three-dimensional shape of an object is estimated from captured images of the plurality of real cameras and converted into the depth map of the virtual viewpoint. Further, it is also possible to use a method in which a depth sensor is installed in advance at a position that may become a virtual viewpoint and a depth map is acquired directly from the relevant depth sensor. The virtual viewpoint depth derivation unit 307 outputs the derived depth map of the virtual viewpoint to the virtual viewpoint drawing unit 308.

At S406, the virtual viewpoint drawing unit 308 draws a virtual viewpoint image in accordance with the position and direction of the virtual viewpoint based on the acquired virtual viewpoint depth map, the captured image data, and the camera parameters. As the method of drawing a virtual viewpoint image, for example, a publicly known method, such as image-based-rendering (BR), is used. Note that the method of drawing a virtual viewpoint image is not limited to this and for example, it may also be possible to use a method such as model-based rendering (MB), which draws a virtual viewpoint image based on estimation results of the three-dimensional shape of an object. The virtual viewpoint drawing unit 308 outputs the drawn virtual viewpoint image. The virtual viewpoint image generated by the virtual viewpoint drawing unit 308 is an image in accordance with the depth map of the virtual viewpoint, which is generated based on determination of the object drawing area. Because of this, an object within the field of view in accordance with the virtual viewpoint and not included in the object drawing area is not displayed in the virtual viewpoint image. On the other hand, an object within the field of view in accordance with the virtual viewpoint and included in the object drawing area is displayed in the virtual viewpoint image.

Effect by First Embodiment

Figure 8A:
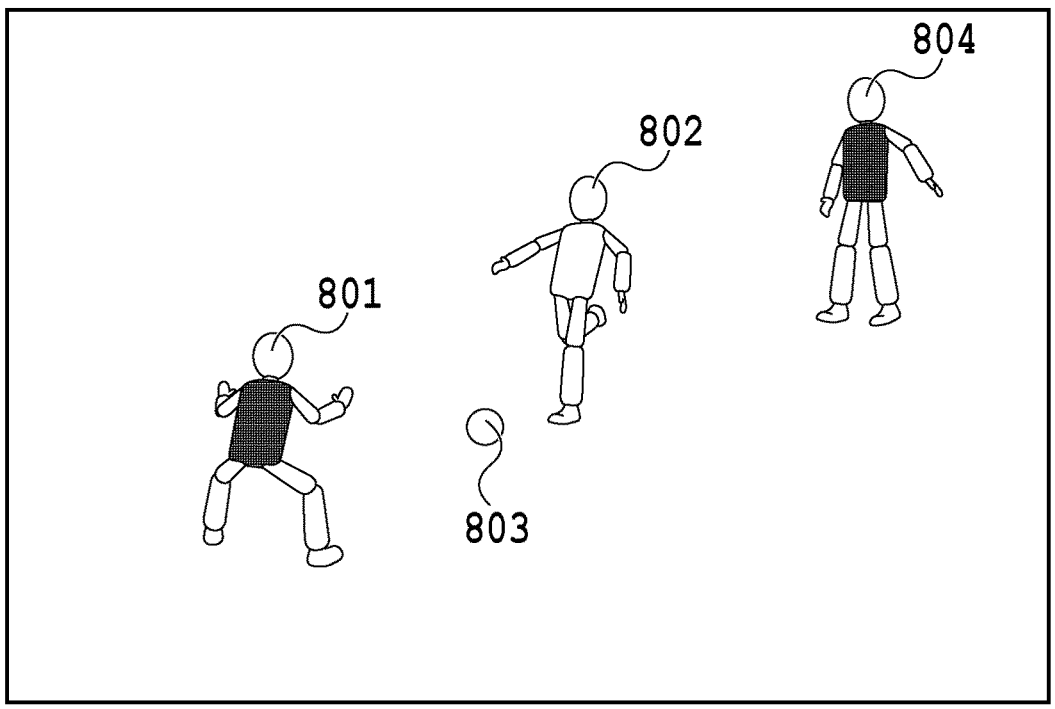
FIG. 8A and FIG. 8B are diagrams explaining an effect by the image processing apparatus.
Figure 8B:
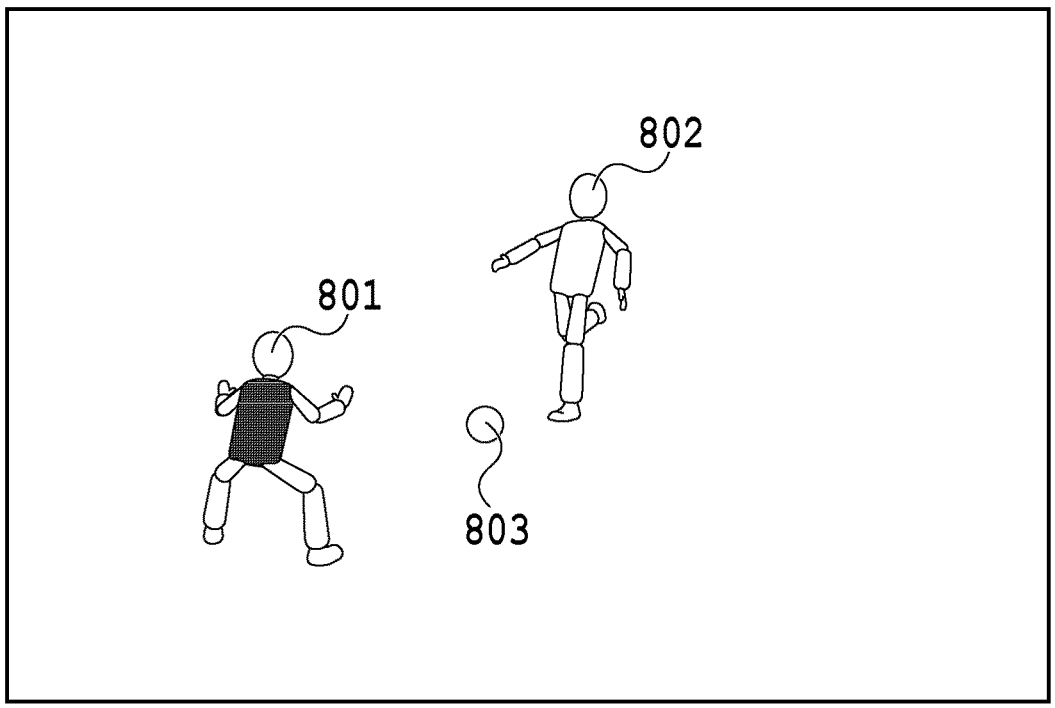

FIG. 8A and FIG. 8B are each an image diagram of a virtual viewpoint image corresponding to the object position/orientation information shown in FIG. 5, which is generated based on image data of a certain image capturing scene. FIG. 8A is an image diagram in a case where the conventional method is applied without applying the first embodiment and FIG. 8B is an image diagram in a case where the first embodiment is applied and the drawing area is set only for the three objects whose IDs are 1, 2, and 3.

By comparing the image diagram in FIG. 8A with the image diagram in FIG. 8B, it is known that a player 804 drawn in the image diagram in FIG. 8A is not drawn in the image diagram in FIG. 8B. As described above, by drawing an object for which a drawing area is set of a plurality of objects, it is possible to generate a virtual viewpoint image without the drawing of an object for which a drawing area is not set. That is, by drawing an object of interest of a plurality of objects, it is possible to generate a virtual viewpoint image without the drawing of an object of non-interest, which is not an object of interest. Consequently, there is no drawing of an object for which a drawing area is not set, and therefore, it is possible to lighten the generation processing load of a virtual viewpoint image. Further, it is possible to attract the attention of viewers to the player 601 and the player 602 fighting over the ball 603, and therefore, it is possible to represent a video image more effectively reflecting the intension of a video image producer. For example, by using the present embodiment example, it is possible to generate a virtual viewpoint video image in which only a star player is drawn in the video images of a soccer game, or to produce a highlighted display by drawing only a player who has violated a rule.

Second Embodiment

Figure 9A:
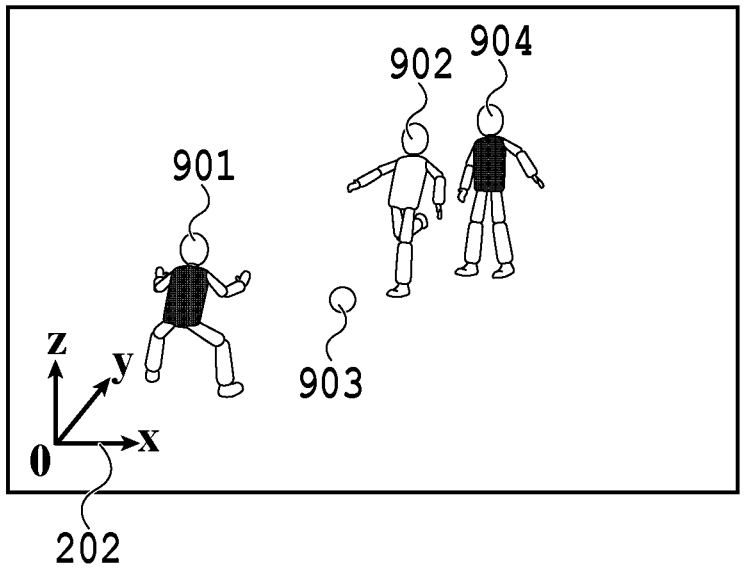
FIG. 9A, FIG. 9B, and FIG. 9C are image diagrams of a scene supposed in a second embodiment.
Figure 9B:
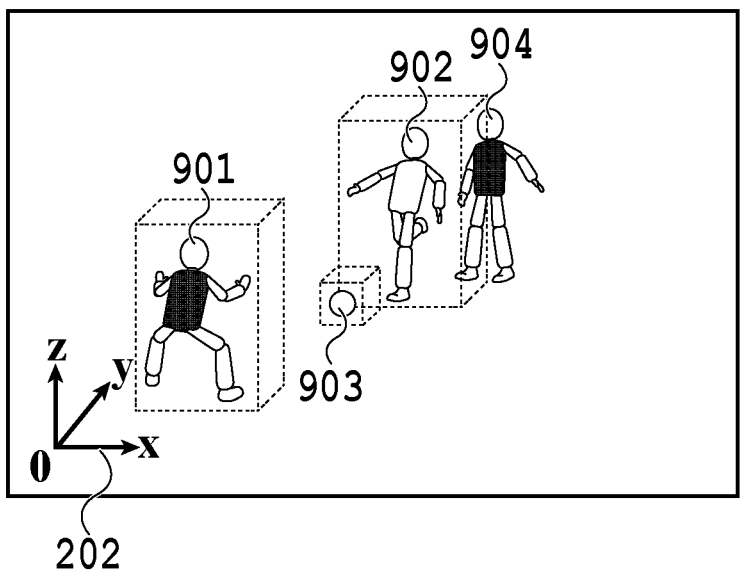
Figure 9C:
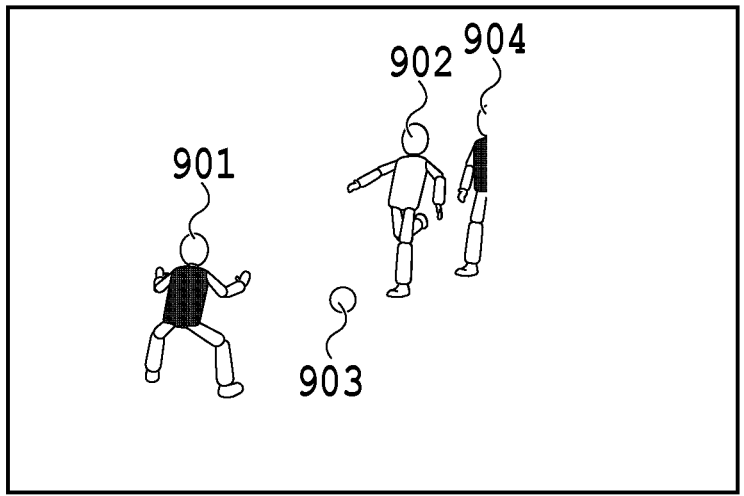

In the above-described first embodiment, it is possible to generate a virtual viewpoint image in which a drawing object is drawn but a non-drawing object is not drawn by classifying all objects existing in an image capturing scene as a drawing object or a non-drawing object and determining the drawing area based on the classification. However, in a case where the player 604 who is not the target of drawing exists at a position in the vicinity of the player 602 who is the target of drawing, a scene is supposed in which part of the player 604 is included within the drawing area of the player 602, and therefore, it is difficult to generate a virtual viewpoint image in which the player 604 is not drawn. FIG. 9A and FIG. 9B are image diagrams explaining a scene supposed in the present embodiment. FIG. 9A is an image diagram showing a virtual viewpoint image in which drawing objects and a non-drawing object are all drawn in the supposed scene. In the image diagram in FIG. 9A, compared to the image diagram in FIG. 6A, the scene is such that a player 904 exists at a position in the vicinity of a player 902. FIG. 9B is an image diagram displaying the image diagram in FIG. 9A by overlapping the drawing areas determined at S404 of the first embodiment. Because the player 904 exists at a position in the vicinity of the player 902, part of the player 904 is included in the drawing area of the player 902. FIG. 9C is an image diagram showing a virtual viewpoint image drawn by applying the first embodiment. Part of the player 904 (in the example shown schematically, the right side of the body of the player 904) included in the drawing area of the player 902 is drawn. By performing procession below in the scene in which the non-drawing object exists at a position in the vicinity of the drawing object as described above, a virtual viewpoint image in which the non-drawing object is not drawn but only the drawing object is drawn is generated.

In a second embodiment, at the time of determining a drawing area, not only a drawing area but also a non-drawing area is determined and by specifying a drawing area and a non-drawing area in accordance with priority, a virtual viewpoint image including only an object a user desires to view is generated even in the above-described scene. The flow of data and the flow of processing performed in the processing apparatus 100 of the second embodiment are basically the same as those of the first embodiment, the function block is the same as that in FIG. 3, and the flowchart is the same as that in FIG. 4. Note that a further function is added to a specific component and a difference from the first embodiment is explained below.

At S403, the drawing object information acquisition unit 304 acquires drawing object information. In the first embodiment, drawing object information is acquired by an input of the ID of an object a user desires to view, that is, by an input of the ID of an object on which a user focuses attention via a UI screen, not shown schematically. In the present embodiment, in addition to this, priority information on each object, which is input by user, is also acquired. The priority information includes information indicating an order of execution of processing for an object. In the scene shown in FIG. 9A, FIG. 9B, and FIG. 9C, for example drawing object information on a player 901 (drawing, priority 4), the player 902 (drawing, priority 3), a ball 903 (drawing, priority 2), and the player 904 (non-drawing, priority 4) is acquired.

Figure 10:
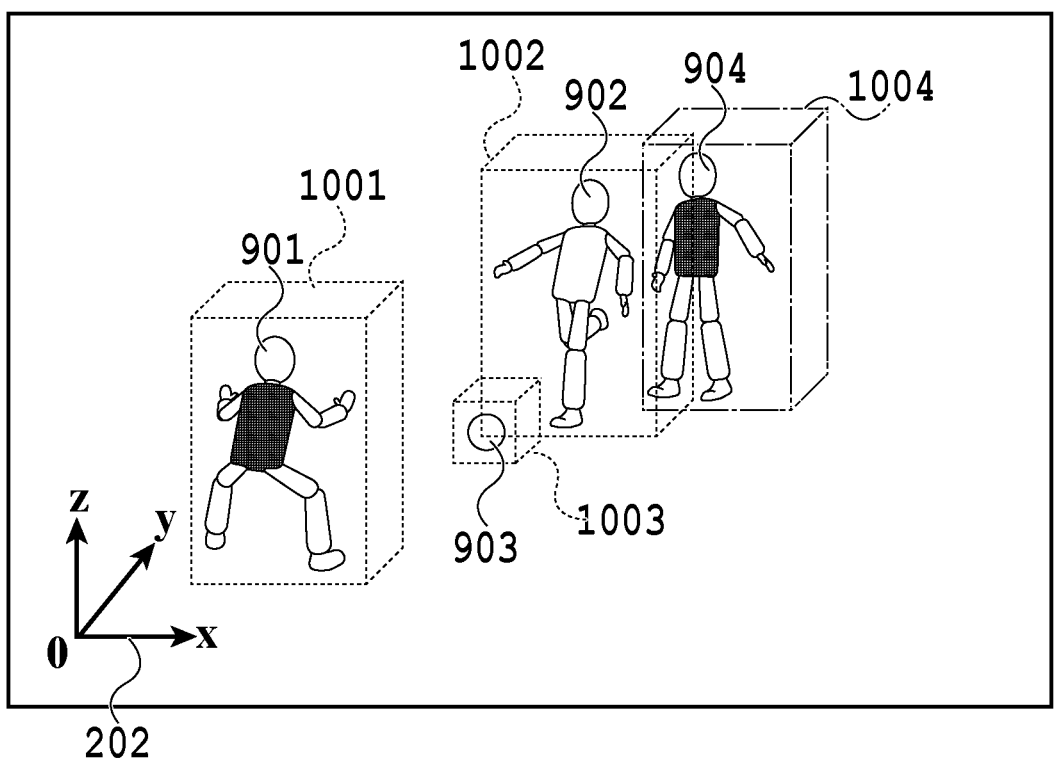
FIG. 10 is a diagram showing an example of a drawing area and a non-drawing area by the image processing apparatus.

At S404, the drawing area determination unit 306 determines a drawing area and a non-drawing area based on the acquired drawing object information. In the first embodiment, although only the drawing area is derived, in the present embodiment, the non-drawing area is also derived in addition to the drawing area. The drawing area is derived by the same method as the derivation method of a drawing area in the first embodiment. The non-drawing area is derived by the same method as the derivation method of a drawing area in the first embodiment. That is, as the non-drawing area, a rectangular parallelepiped connecting coordinate values of the eight vertexes expressed by expression (4) derived by expression (1) to expression (3) based on the position/orientation information on an object classified as a non-drawing target. FIG. 10 is an image diagram displaying the image diagram in FIG. 9A by overlapping the drawing areas and the non-drawing area determined based on the acquired drawing object information. Areas 1001, 1002, and 1003 enclosed by broken lines are drawing areas and an area 1004 enclosed by a one-dot chain line is a non-drawing area. In the present embodiment, the priority of the player 904 is higher than the priority of the player 902, and therefore, priority is given to the non-drawing area 1004 over the drawing area 1002. Consequently, part of the drawing area 1002 overlapping the non-drawing area 1004 is processed as a non-drawing area. The drawing area determination unit 306 outputs the determined drawing areas and non-drawing area to the virtual viewpoint depth derivation unit 307.

Figure 11A:
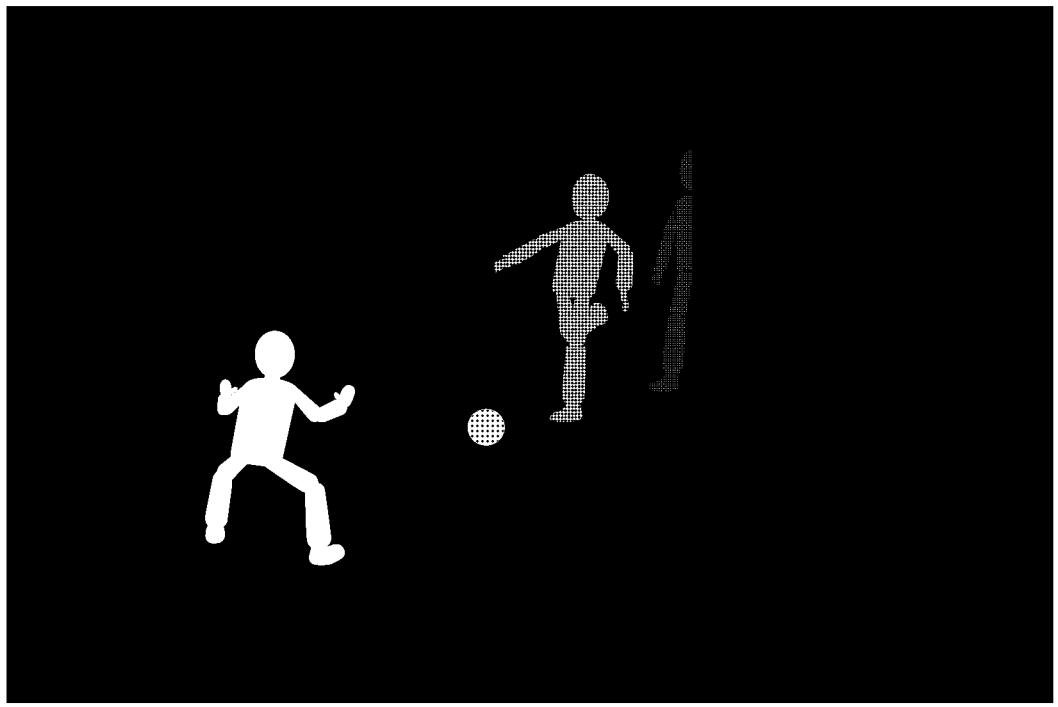
FIG. 11A and FIG. 11B are each an image diagram of a virtual viewpoint depth map.
Figure 11B:
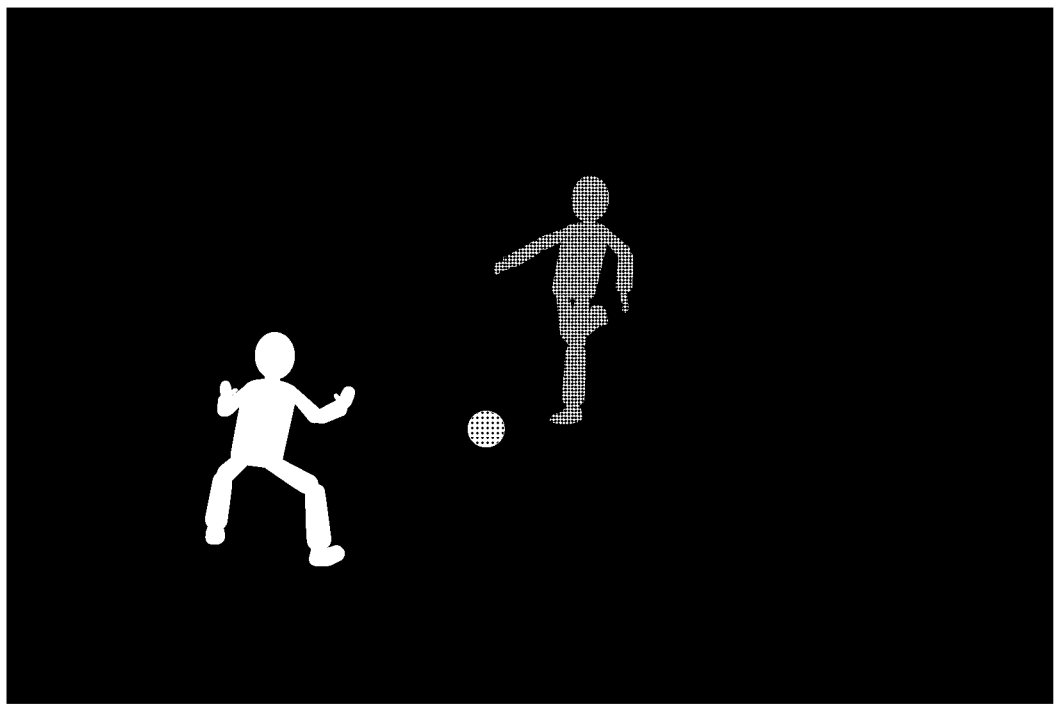

At S405, a virtual viewpoint depth is derived based on the drawing areas and the non-drawing area acquired by the virtual viewpoint depth derivation unit 307, the depth data, and the camera parameters. In the first embodiment, although the depth of the point P in the three-dimensional space, which is included in the drawing area, is derived, in the present embodiment, the depth of the point P is derived based on the priority of the drawing object information. In the present embodiment, the non-drawing area 1004 of the player 904 is priority 1, and therefore, even in a case where a point included in this area is included in the drawing area of another object, the point is not reflected in the virtual viewpoint depth map. FIG. 11A is an image diagram of a virtual viewpoint depth map generated at the time of applying the first embodiment to the scene in FIG. 9A. FIG. 11B is an image diagram of a virtual viewpoint depth map generated at the time of applying the present embodiment. In the depth map in a case where the first embodiment is applied, the area corresponding to the player 904 of the non-drawing object is included. In contrast to this, in the depth map in a case where the present embodiment is applied, the area corresponding to the player 904 of the non-drawing object is not included and the areas corresponding to the players 901 and 902 and the ball 903 of the drawing objects are included.

Effect by Second Embodiment

The processing apparatus 100 in the present embodiment determines whether to display the object within the overlap area of the non-drawing area and the drawing area in the virtual viewpoint image based on the priority of the plurality of objects. Because of this, as shown in FIG. 10, even in the scene in which part of the player 904 of the non-drawing object exists at a position in the vicinity of the player 902 of the drawing object and part of the player 904 overlaps the drawing area 1002 of the player 902, the following effect is brought about. That is, it is possible to generate a virtual viewpoint image in which the player 904 is not drawn but the player 901, the player 902, and the ball 903 are drawn. By applying the present embodiment, even in a case where objects come close to each other, it is made possible to represent a video image in which the intention of a video image producer is reflected effectively. Further, the following effect is brought about. That is, by drawing an object for which a drawing area is set, it is possible to generate a virtual viewpoint image without the drawing of an object for which a drawing area is not set. In other words, by drawing an object of interest of a plurality of objects, it is possible to generate a virtual viewpoint image without the drawing of an object of non-interest, which is not an object of interest. Consequently, there is no drawing of an object for which a drawing area is not set, and therefore, it is possible to reduce the data size of a virtual viewpoint image and to lighten the generation processing load of a virtual viewpoint image.

Third Embodiment

Figure 12A:
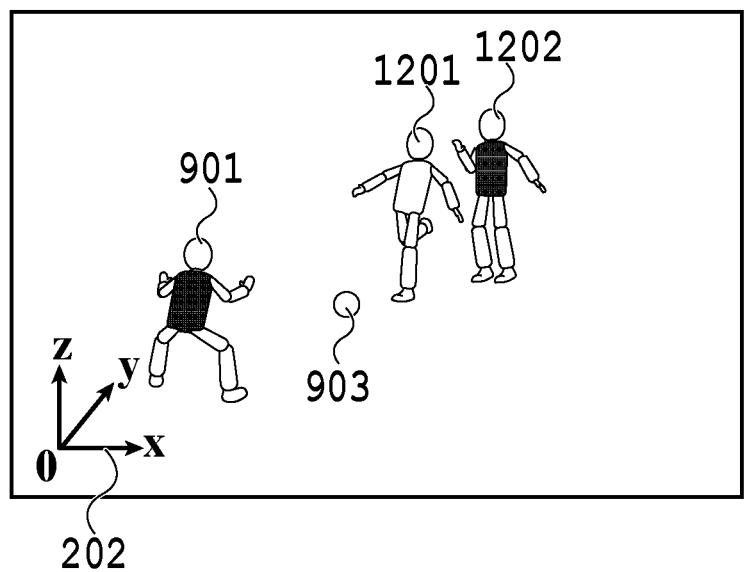
FIG. 12A, FIG. 12B, and FIG. 12C are image diagrams of a scene supposed in a third embodiment.
Figure 12B:
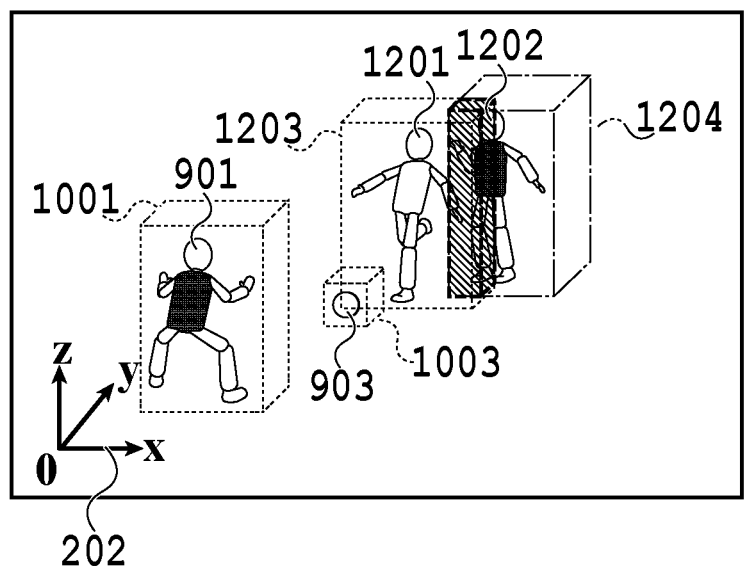
Figure 12C:
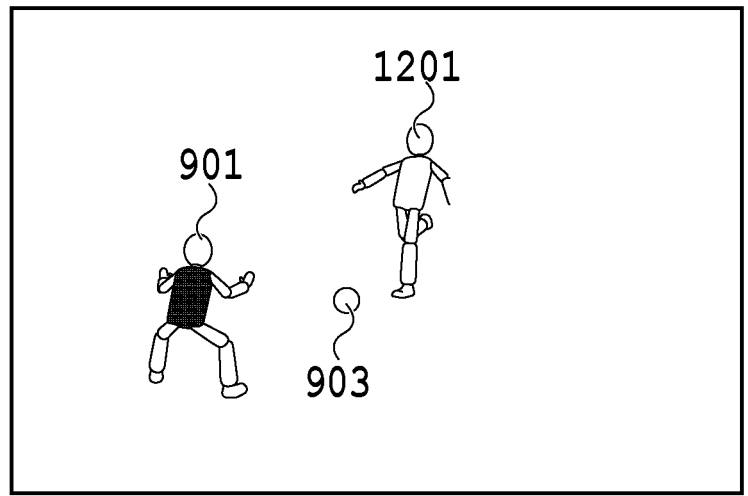

In the above-described second embodiment, even in the scene in which a non-drawing object exists at a position in the vicinity of a drawing object, the following effect is brought about. By performing drawing processing of a drawing area and a non-drawing area in accordance with priority and by drawing a drawing object of a plurality of objects, it is possible to generate a virtual viewpoint image without the drawing of a non-drawing object. However, in a case where the non-drawing-target player 904 exists at a position in the closer vicinity of the drawing-target player 902, the following scene is supposed. The scene is supposed in which it is difficult to generate a virtual viewpoint image in which only the drawing object is drawn because part of the player 902 is included within the non-drawing area 1004 of the player 904. FIG. 12A, FIG. 12B, and FIG. 12C are image diagrams explaining a scene supposed in the present embodiment. FIG. 12A is the image diagram showing a virtual viewpoint image in which drawing objects and a non-drawing object are all drawn in the supposed scene. In the image diagram in FIG. 12A, compared to the case of the image diagram in FIG. 9A, the scene is such that a player 1202 exists at a position in the closer vicinity of a player 1201. FIG. 12B is the image diagram displaying the image diagram in FIG. 12A by overlapping the drawing areas and the non-drawing area determined at S404 of the second embodiment. By the player 1202 existing at a position in the closer vicinity of the player 1201, the left forearm portion of the player 1201 is included in a non-drawing area 1204 of the player 1202. FIG. 12C is the image diagram showing a virtual viewpoint image drawn by applying the second embodiment. Part of the player 1201 (in the example shown schematically, the left forearm portion of the player 1201) included in the non-drawing area 1204 of the player 1202 is not drawn. In the case where the drawing object exists at a position in the closer vicinity of the non-drawing object as described above, by performing the following processing, a virtual viewpoint image in which the non-drawing object is not drawn but only the drawing objects are drawn is generated.

In the third embodiment, in addition to the second embodiment, by determining more detailed drawing and non-drawing areas for the area in which the drawing area and the non-drawing area overlap, even in the above-described scene, a virtual viewpoint image including only objects a user desires to view is generated. The flow of data and the flow of processing performed in the processing apparatus 100 of the third embodiment are basically the same as those of the second embodiment, the function block is the same as that in FIG. 3, and the flowchart is the same as that in FIG. 4. Note that a further function is added to the drawing area determination unit 306 and a difference from the second embodiment is explained below.

At S404, the drawing area determination unit 306 determines a drawing area and a non-drawing area based on the acquired drawing object information. The derivation method of a drawing area and a non-drawing area is the same as that in the second embodiment. Note that in a case where there is an overlap area in which a drawing area and a non-drawing area overlap, the following processing is performed for the overlap area. In a case where there is no overlap area, the following processing is not performed and after the processing at S404 is completed, the processing advances to S405. In the present embodiment, voxel generation is performed only for the overlap area by using the volume intersection method and whether each voxel is a drawing target or a non-drawing target is determined. Detailed processing performed in the drawing area determination unit 306 in the present embodiment is explained by using a function block diagram shown in FIG. 13, a flowchart shown in FIG. 14, and image diagrams shown in FIG. 15A, FIG. 15B, FIG. 15C, and FIG. 15D.

In the following, drawing area determination processing performed by the drawing area determination unit 306 is explained in detail.

Figure 13:
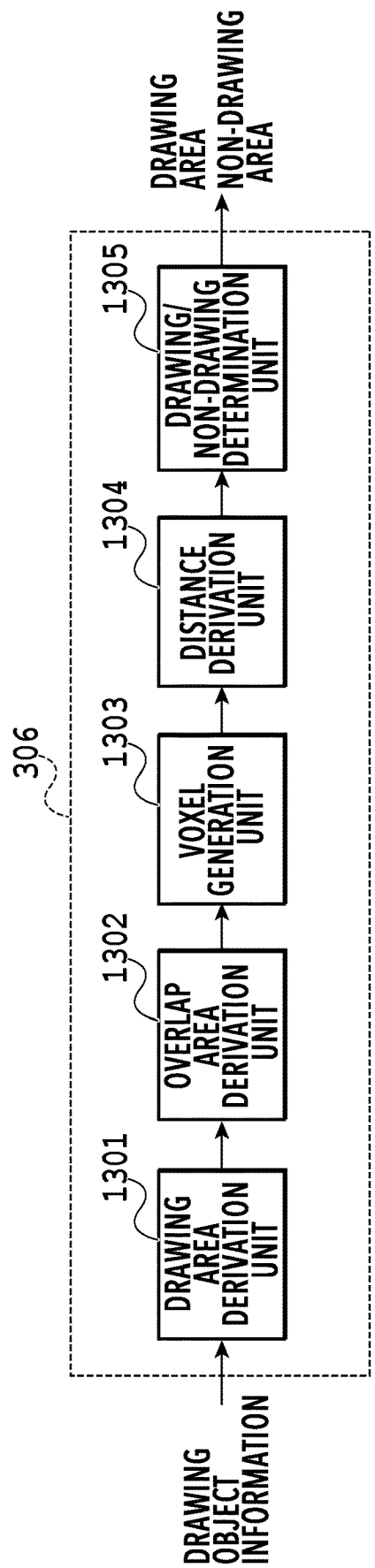
FIG. 13 is a diagram showing a detailed function block of a drawing area determination unit included in an image processing apparatus of the third embodiment.

FIG. 13 is a diagram showing a function block of the drawing area determination unit 306. The drawing area determination unit 306 has a drawing area derivation unit 1301, an overlap area derivation unit 1302, a voxel generation unit 1303, a distance derivation unit 1304, and a drawing/non-drawing determination unit 1305.

Figure 14:
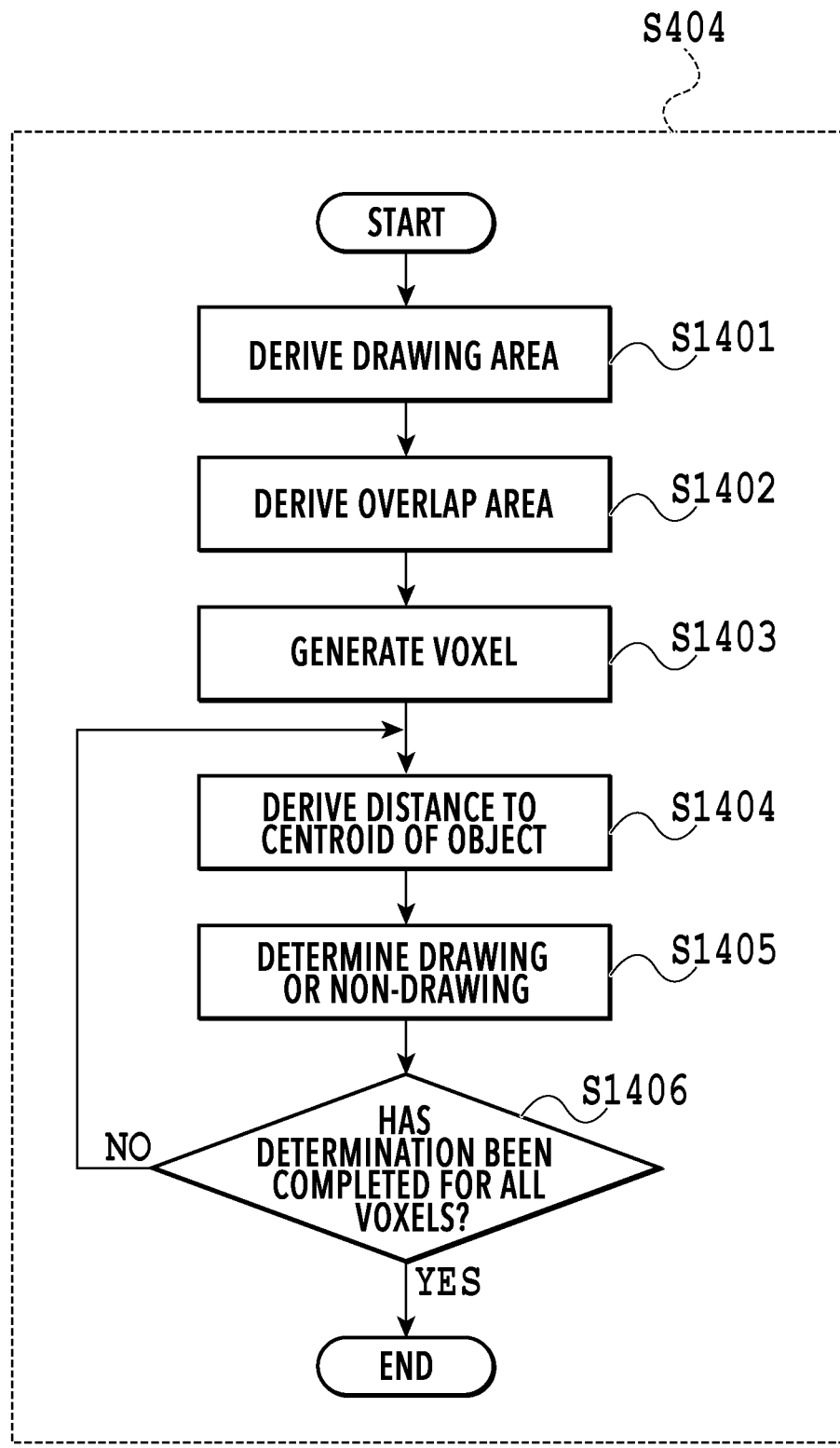
FIG. 14 is a flowchart showing a flow of detailed processing by the drawing area determination unit.

FIG. 14 is a flowchart showing a flow of the drawing area determination processing performed by the drawing area determination unit 306. This drawing area determination processing is performed at S404 in FIG. 4. That is, in the present embodiment, a case is explained where the processing in FIG. 14 is implemented by each component shown in FIG. 13 operating as dedicated hardware based on the control of the CPU 101. Note that it may also be possible to implement the processing in FIG. 14 by the CPU 101 executing a predetermined program.

Figure 15B:
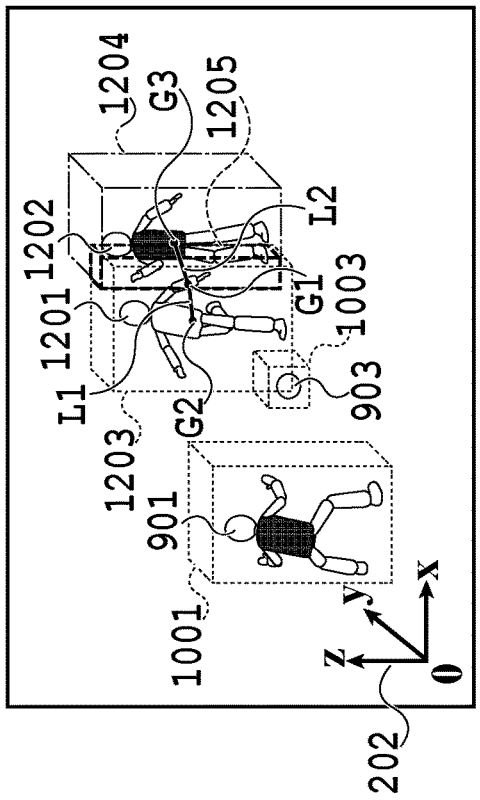
FIG. 15A, FIG. 15B, FIG. 15C, and FIG. 15D are image diagrams explaining processing by the image processing apparatus of the third embodiment.
Figure 15D:
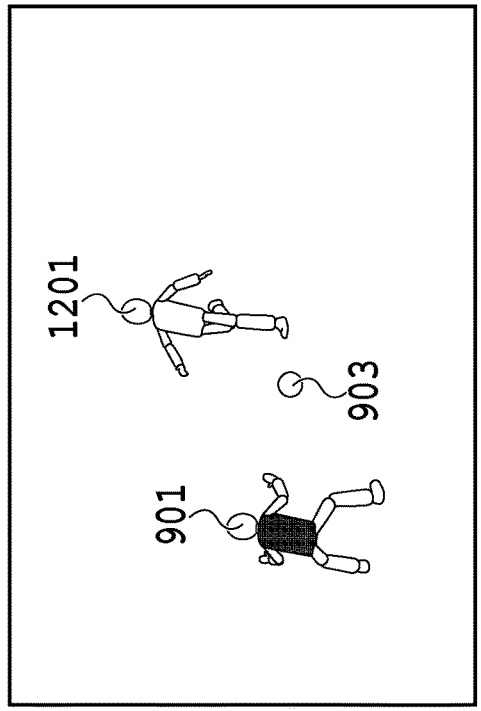
Figure 15A:
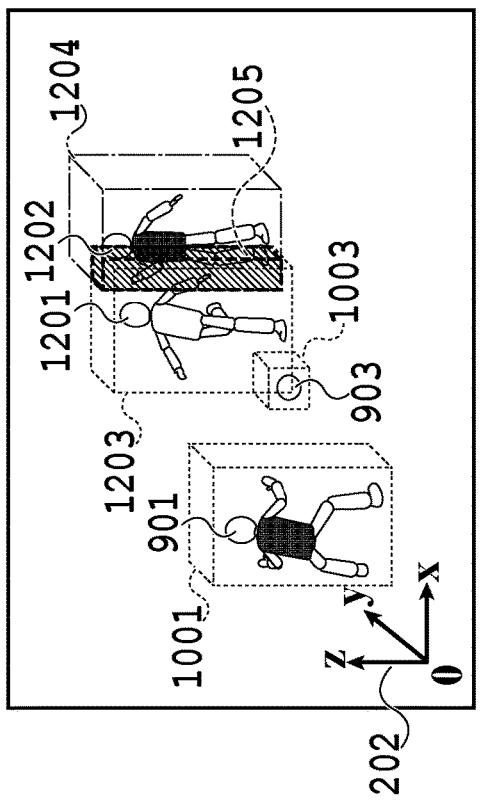
Figure 15C:
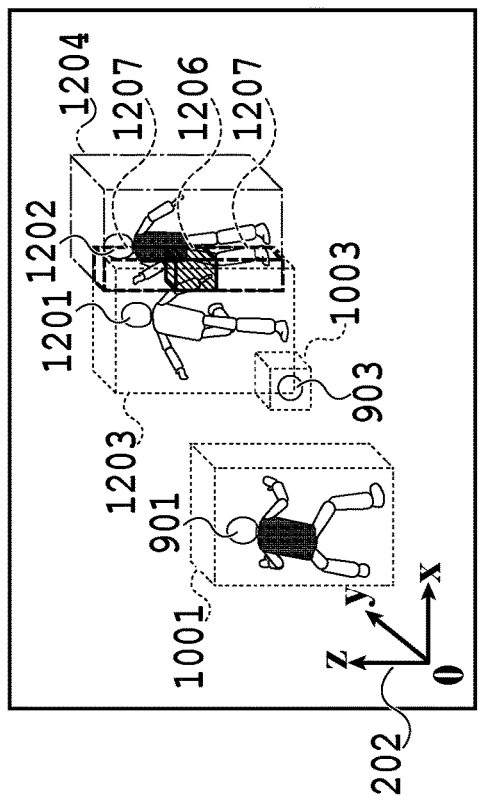

FIG. 15A, FIG. 15B, FIG. 15C, and FIG. 15D are image diagrams in a case where the third embodiment is applied to the same scene as that in FIG. 12A, FIG. 12B, and FIG. 12C. FIG. 15A is the image diagram for explaining overlap area derivation processing. FIG. 15B is the image diagram for explaining distance derivation processing. FIG. 15C is the image diagram for explaining drawing/non-drawing determination processing.

At S1401, the drawing area derivation unit 1301 derives a drawing area and a non-drawing area based on the acquired drawing object information. The derivation method of a drawing area and a non-drawing area is the same as that in the second embodiment. The drawing area derivation unit 1301 outputs the derived drawing area and non-drawing area to the overlap area derivation unit 1302. In FIG. 15A, the player 1201 is set as a drawing object and the player 1202 is set as a non-drawing object and a drawing area 1203 of the player 1201 and the non-drawing area 1204 of the player 1202 are derived.

At S1402, the overlap area derivation unit 1302 derives an overlap area in which the drawing area and the non-drawing area overlap based on the drawing area and the non-drawing area derived by the drawing area derivation unit 1301. The overlap area derivation unit 1302 records the coordinates of the vertexes configuring the overlap area and outputs the coordinates of the vertexes to the voxel generation unit 1303 as overlap area information. In FIG. 15A, an overlap area 1205 in which the drawing area 1203 and the non-drawing area 1204 overlap is derived.

At S1403, the voxel generation unit 1303 generates a voxel that is an element for the portion corresponding to the overlap area of the object based on the overlap area information derived by the overlap area derivation unit 1302. That is, a voxel is generated for the portion included in the area surrounded by the coordinates of the vertexes of the overlap area of the object. In the present embodiment, for the overlap area, a voxel is generated by a publicly known method, such as the volume intersection method. In the present embodiment, although the size of one side of one voxel is set to 0.5 mm, it is also possible to perform the present embodiment even in a case where the size of a voxel is set smaller or larger than 0.5 mm. Further, in the present embodiment, although the case is explained where a voxel of an object included in the overlap area is generated by the volume intersection method, the voxel generation method is not limited to this method. In a case where it is possible to generate a detailed shape of an object included in the overlap area, for example, it is also possible to perform the present embodiment by shape estimation by a stereo method. The voxel generation unit (element generation unit) 1303 outputs data of the generated voxel of the object included in the overlap area to the distance derivation unit 1304. The voxel data in the present embodiment is data including three-dimensional information on the centroid of the voxel and the voxel size.

At S1404, the distance derivation unit 1304 derives a distance between the centroid positions of each voxel and each object based on the coordinates of the centroid of each voxel generated by the voxel generation unit 1303 and the acquired object position/orientation information. The distance derivation unit 1304 outputs the derived distance to the drawing/non-drawing determination unit 1305. For example, in FIG. 15B, by taking a centroid position G1 of a certain voxel within the overlap area 1205 as a reference point, a distance L1 between the centroid position G1 and a centroid position G2 of the drawing-target player 1201 and a distance L2 (>L1) between the centroid position G1 and a centroid position G3 of the non-drawing-target player 1202 are derived.

At S1405, the drawing/non-drawing determination unit 1305 determines whether the voxel is a voxel included in the drawing-target object or a voxel included in the non-drawing-target object based on the distances derived by the distance derivation unit 1304. The drawing/non-drawing determination unit 1305 determines that the voxel belongs to the object whose derived distance between the centroid position of the voxel and the centroid position of each object is the shortest. That is, the drawing/non-drawing determination unit 1305 determines the object to which the voxel belongs. The drawing/non-drawing determination unit 1305 determines that the voxel is a drawing voxel, which is a drawing target, in a case where the object to which the voxel belongs is the drawing-target object, and determines that the voxel is a non-drawing voxel, which is a non-drawing target, in a case where the object to which the voxel belongs is the non-drawing-target object. Then, the drawing/non-drawing determination unit 1305 generates a drawing/non-drawing area including the drawing voxel and the non-drawing voxel. For example, in FIG. 15C, regarding the overlap area 1205, the voxel is determined to be a drawing voxel for an area 1206 including the left forearm portion of the player 1201 and the voxel is determined to be a non-drawing voxel for an area 1207 not including the left forearm portion of the player 1201.

At S1406, the drawing area determination unit 306 determines whether or not the drawing/non-drawing determination processing has been performed for all the voxels included in the overlap area. In a case where it is determined that the drawing/non-drawing determination processing has not been performed yet for all the voxels, the processing returns to S1404 and the processing of the distance derivation at S1404 and the drawing/non-drawing determination at S1405 is performed for the remaining voxels for which the drawing/non-drawing determination processing has not been performed yet. In a case where the drawing/non-drawing determination processing has been performed for all the voxels, the drawing area determination unit 306 outputs the drawing/non-drawing area derived in detail, that is, the drawing/non-drawing area in which the drawing voxel and the non-drawing voxel are included to the virtual viewpoint depth derivation unit 307.

Effect by Third Embodiment

FIG. 15D is the image diagram of a virtual viewpoint image generated by applying the third embodiment to the same scene as that in FIG. 12A, FIG. 12B, and FIG. 12C. A virtual viewpoint image in which the player 901, the ball 903, and the player 1201, which are the drawing targets, are drawn but the player 1202, which is the non-drawing target, is not drawn is generated.

According to the present embodiment, it is possible to generate virtual viewpoint images in a variety of scenes compared to the second embodiment by performing the drawing/non-drawing determination for each voxel for the object within the overlap area of the drawing area and the non-drawing area and by specifying the drawing area and the non-drawing area based the results. That is, it is possible to generate a virtual viewpoint image of a scene including a scene in which a drawing object exists at a position in the closer vicinity of a non-drawing object. Consequently, there is no drawing of an object for which a drawing area is not set, and therefore, it is possible to reduce the data size of a virtual viewpoint image and to lighten the generation processing load of a virtual viewpoint image.

Other Embodiments

Figure 16:
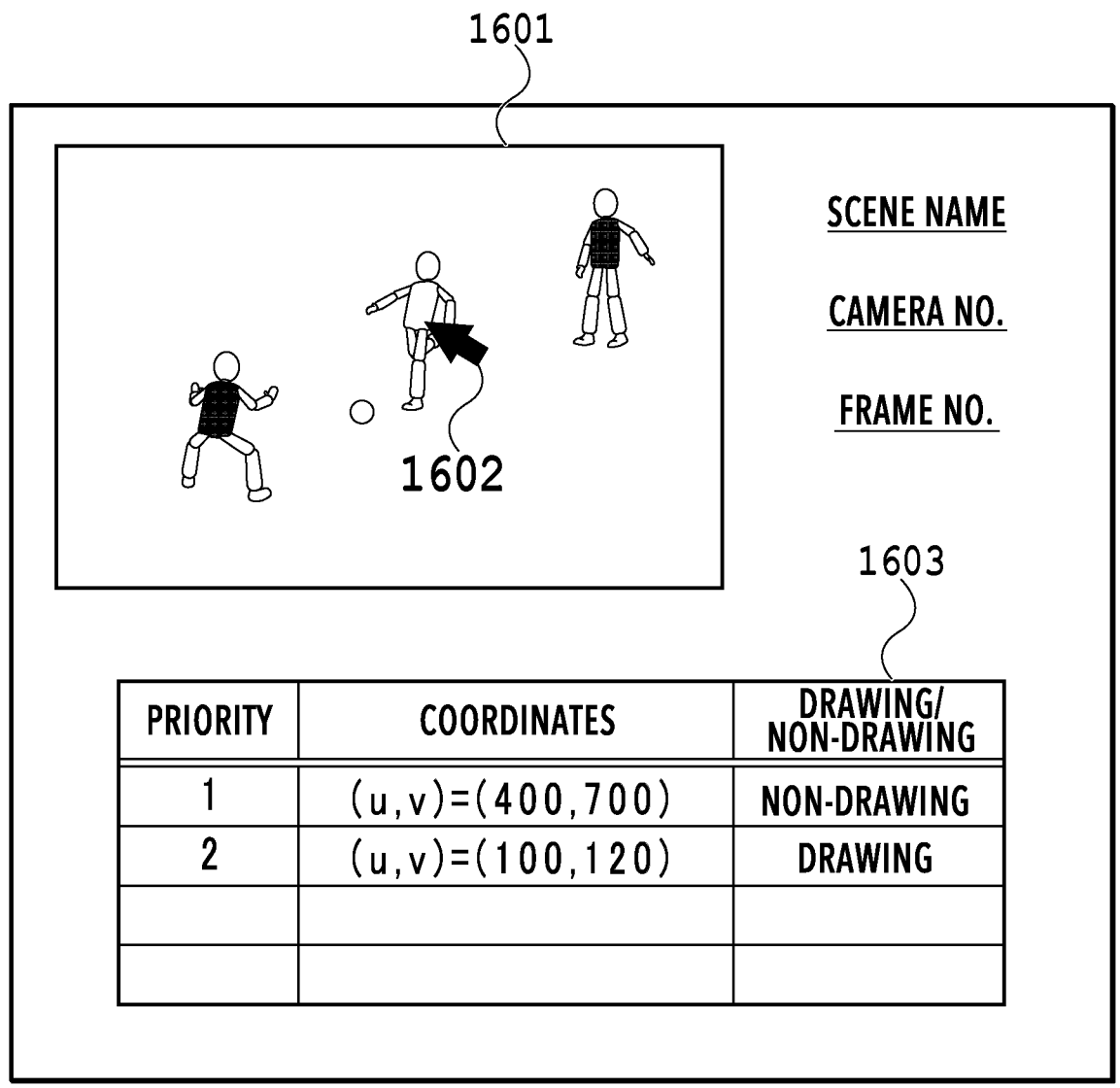
FIG. 16 is a diagram showing an example of a UI screen of a drawing object information acquisition unit.

In the first to third embodiments, although the drawing object information acquisition unit 304 acquires drawing object information including an identifier ID of an object desired to be drawn, the embodiments are not limited to this and even in an aspect in which a user inputs drawing object information on an image, it is possible to performed the first to third embodiments. FIG. 16 is a diagram showing an example of a UI screen that a user operates. An image 1601 is an image of a selected scene, a selected camera, and a selected frame number, respectively. A cursor (pointer) 1602 on the image is a tool for specifying an object and it is possible to click a position of the image, at which an object exists. A table 1603 is a table in which an object selected by the cursor 1602 is stored. An item in which priority is set, an item in which coordinates of a position on the image of the selected object are stored, and an item in which drawing/non-drawing is selected are included. In FIG. 16, although the cursor is used to specify an object, it may also be possible to specify an object by enclosing the object by a circle or the like, or to specify an object by using a touch panel. Further, it is also possible to perform the first to third embodiments by, for example, a method of specifying all objects included in a circle whose center is a specified point and whose radius is 10 m as the drawing objects.

In the first to third embodiments, although by taking an object as a reference, the drawing area and the non-drawing area are determined, the embodiments are not limited to this and even in a case where the drawing area and the non-drawing area are set directly on the three-dimensional space, it is possible to perform the first to third embodiments.

In the above, although a virtual viewpoint image is drawn by using the captured image data, the virtual viewpoint depth, and the camera parameters, the embodiments are not limited to this and for example, even in a case where a virtual viewpoint image is drawn by using the captured image data and the camera parameters by the IBR, it is possible to perform the first to third embodiments. In the case of this method, the depth data is not necessary, and therefore, it is possible to lighten the processing load accordingly.

In the above, the case is explained where the drawing area is determined based on the drawing object information and the object position/orientation information. It is also possible to perform the first to third embodiments by determining the drawing area by using position information and shape information set in advance in place of the position/orientation information.

In the above, although the case is explained where all the objects existing on the field are taken to be the targets for which the object position/orientation information is acquired, it is also possible to take all the objects existing in an image capturing scene to be targets for which the object position/orientation information is acquired.

In the above, although the case is explained where all the objects existing on the field are taken to be the targets for which the drawing object information is acquired, it is also possible to take all the objects existing in an image capturing scene to be the targets for which the drawing object information is acquired.

In the third embodiment, although the case is explained where the distance is taken to be the reference of determination of whether or not to display an object within the overlap area of the drawing area and the non-drawing area in the virtual viewpoint image, this is not limited. In the third embodiment, it is only required to determine whether to display an object within the overlap area in the virtual viewpoint image based on a relationship between the object within the overlap area and an object outside the overlap area. The relationship between a plurality of objects, which is the reference of determination, may be a position relationship or a color relationship. For example, it is also possible to take information on continuity in color of each voxel and each object, continuity in position of each voxel and each object by position information, and so on to be a drawing/non-drawing determination reference.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present embodiment, it is possible to improve convenience relating to generation of a virtual viewpoint image by controlling drawing of an object within an image capturing range of a virtual camera.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-030080, filed Feb. 22, 2018, which is hereby incorporated by reference wherein in its entirety.

What is claimed is:

1. An image processing apparatus comprising:
one or more memories storing instructions; and
one or more processors executing the instructions to:
  obtain viewpoint information for specifying a position of a virtual viewpoint and a view direction from the virtual viewpoint;
  determine a three-dimensional area in an image capturing area captured by a plurality of imaging apparatuses based on a position of a specific object in the image capturing area; and
  generate, based on images by the plurality of imaging apparatuses, a virtual viewpoint image which corresponds to the virtual viewpoint, includes the specific object included in the determined three-dimensional area and included in a field of view specified by the position of the virtual viewpoint and the view direction from the virtual viewpoint specified based on the obtained viewpoint information, and does not include an object that is not included in the determined three-dimensional area and is included in the field of view.

2. The image processing apparatus according to claim 1, wherein the specific object, is an object specified based on a user operation.

3. The image processing apparatus according to claim 1, the one or more processors further execute the instructions to:
  determine as which of a plurality of classes an object within the image capturing area is classified; and
  determine a second three-dimensional area in accordance with a position and a size of an object determined to be classified as a second class of the determined plurality of classes, wherein
  a first three-dimensional area is determined based on a position and a size of an object determined to be classified as a first class of the determined plurality of classes, and
  an object of a plurality of objects in the field of view specified by the position of the virtual viewpoint and the view direction from the virtual viewpoint specified based on the obtained viewpoint information, which is not included in the determined first three-dimensional area, is not included in the virtual viewpoint image and an object of the plurality of objects, which is not included in the determined second three-dimensional area, is included in the virtual viewpoint image.

4. The image processing apparatus according to claim 3, the one or more processors further execute the instructions to determine whether to display an object within the field of view specified by the position of the virtual viewpoint and the view direction from the virtual viewpoint specified based on the obtained viewpoint information and in an overlap area of the determined first three-dimensional area and the determined second three-dimensional area in the virtual viewpoint image based on priority of a plurality of objects, wherein
  the virtual viewpoint image is generated based on determination whether to display the object within the field of view.

5. The image processing apparatus according to claim 3, the one or more processors further execute the instructions to determine whether to display an object within the field of view specified by the position of the virtual viewpoint and the view direction from the virtual viewpoint specified based on the obtained viewpoint information and in an overlap area of the determined first three-dimensional area and the determined second three-dimensional area in the virtual viewpoint image based on a relationship between the object within the overlap area and an object outside the overlap area, wherein
  the virtual viewpoint image is generated based on determination of whether to display the object within the field of view.

6. The image processing apparatus according to claim 5, wherein
  whether to display an object within the overlap area in the virtual viewpoint image is determined based on a position relationship between the object within the overlap area and an object outside the overlap area.

7. The image processing apparatus according to claim 6, wherein
  , in a case where a distance between the object within the overlap area and an object classified as the first class is shorter than a distance between the object within the overlap area and an object classified as the second class, the object within the overlap area in the virtual viewpoint image is determined to be displayed.

8. The image processing apparatus according to claim 5, wherein
  whether to display the object within the overlap area in the virtual viewpoint image is determined based on a color relationship between the object within the overlap area and an object outside the overlap area.

9. The image processing apparatus according to claim 1, wherein
  the three-dimensional area having a predetermined shape including the specific object is determined.

10. The image processing apparatus according to claim 9, wherein
  the predetermined shape is a rectangular parallelepiped.

11. The image processing apparatus according to claim 1, wherein
the three-dimensional area is determined based on information indicating the position and a shape of the specific object.

12. The image processing apparatus according to claim 1, wherein
the object is a human body or a region of a human body.

13. An image processing method comprising:
obtaining viewpoint information for specifying a position of a view virtual viewpoint and a view direction from the virtual viewpoint;
determining a three-dimensional area in an image capturing area captured by a plurality of imaging apparatuses based on a position of a specific object in the image capturing area; and
generating, based on images by the plurality of imaging apparatuses, a virtual viewpoint image which corresponds to the virtual viewpoint includes the specific object included in the determined three-dimensional area and included in a field of view specified by the position of the virtual viewpoint and the view direction from the virtual viewpoint specified based on the obtained viewpoint information, and does not include an object that is not included in the determined three-dimensional area and is included in the field of view.

14. The image processing method according to claim 13, further comprising:
determining as which of a plurality of classes an object within the image capturing area is classified;
determining a first three-dimensional area based on a position and a size of an object determined to be classified as a first class of the determined plurality of classes; and
determining a second three-dimensional area in accordance with a position and a size of an object determined to be classified as a second class of the determined plurality of classes, wherein
an object of a plurality of objects in the field of view specified by the position of the virtual viewpoint and the view direction from the virtual viewpoint specified based on the obtained viewpoint information, which is not included in the determined first three-dimensional area, is not included in the virtual viewpoint image and an object of the plurality of objects, which is not included in the determined second three-dimensional area, is included in the virtual viewpoint image.

15. The image processing method according to claim 14, further comprising:
determining whether to display an object within the field of view specified by the position of the virtual viewpoint and the view direction from the virtual viewpoint specified based on the obtained viewpoint information and in an overlap area of the determined first three-dimensional area and the determined second three-dimensional area in the virtual viewpoint image based on priority of a plurality of objects, wherein
the virtual viewpoint image is generated based on determination of whether to display the object within the field of view.

16. The image processing method according to claim 13, further comprising:
determining whether to display an object within the field of view specified by the position of the virtual viewpoint and the view direction from the virtual viewpoint specified based on the obtained viewpoint information and in an overlap area of a determined first three-dimensional area and a determined second three-dimensional area in the virtual viewpoint image based on a relationship between the object within the overlap area and an object outside the overlap area, wherein
the virtual viewpoint image is generated based on determination of whether to display the object within the field of view.

17. A non-transitory computer readable storage medium storing a program for causing a computer to perform an image processing method, wherein
the image processing method comprises:
obtaining viewpoint information for specifying a position of a virtual viewpoint and a view direction from the virtual viewpoint;
determining a three-dimensional area in an image capturing area captured by a plurality of imaging apparatuses based on a position of a specific object in the image capturing area; and
generating based on images by the plurality of imaging apparatuses, a virtual viewpoint image which corresponds to the virtual viewpoint, includes the specific object included in the determined three-dimensional area and included in in a field of view specified by the position of the virtual viewpoint and the view direction from the virtual viewpoint specified based on the obtained viewpoint information, and does not include in the determined three-dimensional area is included in the field of view.

* * * * *